United States Patent [19]
Pavley et al.

[11] Patent Number: 5,664,208
[45] Date of Patent: Sep. 2, 1997

[54] METHODS AND APPARATUSES FOR SEAMLESS COMPOUND DOCUMENT PROCESSING

[75] Inventors: John Franklin Pavley, Cupertino; John Benton Turner, II; Gary Stephen Hanson, both of Mountain View, all of Calif.

[73] Assignee: Apple Computer, Inc., Cupertino, Calif.

[21] Appl. No.: 441,946

[22] Filed: May 16, 1995

[51] Int. Cl.$^6$ ........................................ G06F 15/00
[52] U.S. Cl. ................ 395/777; 395/776; 395/778; 395/793; 345/335
[58] Field of Search ................... 395/144, 145, 395/146, 147, 155, 156, 157, 160, 700, 800, 774, 776, 777, 778, 335, 340, 346, 936, 937, 792; 364/419.1, 419.17

[56] References Cited

U.S. PATENT DOCUMENTS

| | | | |
|---|---|---|---|
| 4,815,029 | 3/1989 | Barker et al. | 395/146 |
| 4,868,765 | 9/1989 | Diefendorff | 395/157 |
| 4,933,880 | 6/1990 | Borgendale et al. | 395/147 |
| 5,140,677 | 8/1992 | Fleming et al. | 395/159 |
| 5,142,618 | 8/1992 | Fujiwara et al. | 395/146 |
| 5,181,162 | 1/1993 | Smith et al. | 364/419.19 |
| 5,206,951 | 4/1993 | Khoyi et al. | 395/650 |
| 5,212,770 | 5/1993 | Smith et al. | 395/155 |
| 5,339,430 | 8/1994 | Lundin et al. | 395/700 |
| 5,341,478 | 8/1994 | Travis, Jr. et al. | 395/200.03 |
| 5,345,551 | 9/1994 | Shelley et al. | 395/157 |
| 5,408,599 | 4/1995 | Nomura et al. | 395/147 |
| 5,423,043 | 6/1995 | Fitzpatrick et al. | 395/700 |
| 5,475,805 | 12/1995 | Murata | 395/145 |
| 5,479,601 | 12/1995 | Matheny et al. | 395/155 |
| 5,485,617 | 1/1996 | Stutz et al. | 395/700 |
| 5,495,565 | 2/1996 | Millard et al. | 395/147 |
| 5,499,333 | 3/1996 | Doudnikoff et al. | 395/153 |
| 5,517,605 | 5/1996 | Wolf | 395/155 |
| 5,537,526 | 7/1996 | Anderson et al. | 395/148 |

FOREIGN PATENT DOCUMENTS

| | | |
|---|---|---|
| 173 125 | 3/1986 | European Pat. Off. . |
| 530 122 A1 | 3/1993 | European Pat. Off. . |
| 578 207 A2 | 1/1994 | European Pat. Off. . |
| 578 204 A2 | 1/1994 | European Pat. Off. . |
| WO92/08199 | 5/1992 | WIPO . |

OTHER PUBLICATIONS

R.E. Berry, "The Designer's Model of the CUA Workplace," IBM Systems Journal, vol. 31, No. 3, Armonk, NY (1992).

Brüning & Everth, "RagTime 2," Brüning & Everth Softwarepartner GmbH, Heyden & Son Limited, London (1987).

Kraig Brockschmidt, "Inside OLE 2," Microsoft Press, pp. 496–847, Redmond, WA (1994).

Microsoft OLE 2.0 Design Team, "OBJECT Linking Embedding, OLE 2.0 Design Specification," Microsoft Corp., CA (Apr. 15, 1993).

(List continued on next page.)

*Primary Examiner*—Mark K. Zimmerman
*Assistant Examiner*—Stephen Hong
*Attorney, Agent, or Firm*—Hickman Beyer & Weaver

[57] ABSTRACT

A compound document in a computer, which includes a first object editor embedded in the compound document for rendering first data in a first data content area of the compound document. The compound document further includes a second object editor embedded in the compound document for rendering second data in a second data content area of the compound document, the first data content area and the second data content area being mutually exclusive. Further, there are embedded a plurality of editing controllers in the compound document for selectively editing attributes of a selection of one of the first and second data. The compound document further includes a data switching system for communicating attribute data between the editing controllers and the first and second object editors, the attribute data representing the attributes of the selection, wherein the data switching system determines which one of the plurality of editing controllers receives the attribute data based on interest registered by each of the plurality of editing controllers with the data switching system.

21 Claims, 14 Drawing Sheets

OTHER PUBLICATIONS

Unknown, "Object Linking & Embedding," Programmer's Ref., Microsoft Corp., CA (1992–1993).

D.E. Lipkie, S.R. Evans, J.K. Newlin, and R.L. Weissman, "Star Graphics: An Object–Oriented Implementation," Xerox Corp., CA, Computer Graphics, vol. 16, No. 3 (Jul. 1992).

Robert Cowart, "Mastering Windows™ 3.1," Sybex, Inc., Alameda, CA, pp. 7–17, (1992–1993).

P. Zappacosta, "Module–Based Software Integration: The Next Software Revolution," Logitech, Inc., Redwood City, CA, Sessions Presented at Wescon/84, (Oct.–Nov. 1984).

Colin Hunter, "Software Components Stem Growing Costs," Electronic Product Design, (Mar. 1995).

H.L. Yudkin, "Emerging Trends Present Opportunities, Challenges for Standards Development," Computerworld Extra, pp. 67–68, (Aug. 1988).

Michael Floyd, "The Evolution of Component–Based Programming," Dr. Dobb's Journal (Jan. 1991).

J.A. Carter and J.B. Tubman, "Integrated Software: Past, Present and Future," Future Computing Systems, vol. 2, No. 2 (1987).

Joseph A. Goguen, "Reusing and Interconnecting Software Components," SRI International, Design for Adaptability, IEEE (1986).

Unknown, "Viewpoint 1.0 Release Document," Xerox Corp., Palo Alto, CA, (1985).

Unknown, "Services Programmer's Guide," Xerox Corp., Palo Alto, CA, (Sep. 1985).

Unknown, "ViewPoint Programmer's Manual," Xerox Corp., Sunnyvale, CA, (Dec. 1986).

Steve Zurier, "Users Cast Votes for 3.1; Grass–Roots Windows Movement Gathers Speed," Government Computer News, vol. 1, No. 15 (Jul. 1992).

Unknown, "Implementing Implicit Drag Along Without Regard to Object Set Type," IBM Technical Disclosure Bulletin, vol. 27, No. 10A, p. 5518, (Mar. 1985) US.

Unknown, "Common Editing Arrangement for Different Object Types in Text Processing," IBM Technical Disclosure Bulletin, vol. 27, No. 9, pp. 5049–5052, (Feb. 1985) US.

Unknown, "Dragging Marked Data to an Editor Window," IBM Technical Disclosure Bulletin, vol. 34, No. 10B, pp. 202–203, (Mar. 1992) US.

Alan Simpson, "Mastering Wordperfect 5.1 & 5.2 for Windows," Sybex, Inc., Alameda, CA (1992–1993).

Unknown, "Microsoft Mail," User's Guide, Overview of Mail and the Outline Documentation, Ch. 1, Microsoft Corp., (1992).

METHODS AND APPARATUSES FOR SEAMLESS COMPOUND DOCUMENT PROCESSING

COPYRIGHT NOTICE

A portion of the disclosure of this patent document contains material which is subject to copyright protection. The owner has no objection to the facsimile reproduction by any one of the patent disclosure, as it appears in the Patent and Trademark Office patent files or records, but otherwise reserves all copyright rights whatsoever

BACKGROUND OF THE INVENTION

The present invention relates generally to computer systems and to computerized document processing systems. More particularly, the present invention relates to apparatuses and methods for processing a compound document in a computer.

Traditionally, documents are processed using stand-alone application programs. Each document in the application-centered approach typically utilizes a single application program to render and manipulate its data. Further, data within an application-centered document is homogenous throughout. By way of example, a text document typically contains only text and is rendered and manipulated by a word processor application program. In the application-centered world, if a computer user wants to create a graphics image, he or she would typically have to switch to a different document that is associated with, say a graphics application program.

In contrast documents are documents whose contents are non-homogenous. A compound document may have within it different types of data, such as text, graphics, sound, or other types of data that are displayable or manipulable using a computer. Representative existing compound document architectures include OpenDoc™ by Apple Computer, Inc. of Cupertino, Calif. and OLE™ by Microsoft Corporation of Redmond, Wash.

Furthermore, a compound document embeds, or incorporates, multiple applications in a single compound document framework. Each application program so embedded is responsible for rendering and manipulating its associated data in a discrete content area of the compound document. As such, a computer user may move among the discrete content areas to use the respectively associated embedded applications to edit the compound document's non-homogeneous contents without having to switch documents. For this reason, many people find that compound documents are easy to work with.

To facilitate a discussion of compound documents, FIG. 1 shows a traditional compound document along with its various constituting elements. The compound document of FIG. 1 may be created by, for example, the aforementioned OpenDoc™ compound document software. Referring now to FIG. 1, there is shown a window 200 representing a window within which a compound document may be displayed and manipulated. As is well known to those of skill in the art, window 200 may include a menu bar 202 and a display area 204. There may optionally be provided a scroll bar 206 for permitting the computer user to scroll through different portions of the compound document.

Within display area 204 there is shown a root view of the compound document. In a compound document, the aforementioned different types of data, e.g., text, graphics, sound, and the like, co-exist within a document "container." The root view is a visual representation of these different types of data in the aforementioned compound document container.

Within the document container, a plurality of objects may be embedded, i.e., incorporated or contained. As the term is used herein, an object is defined as an area in a document that contains information or "content." Programs that manipulate object information are called object editors. Visual representations of objects on screen or in an electronic document are called data objects. In a typical compound document architecture objects may contain other objects in an embedding hierarchy, where the first object present in a document is referred to as the root object. Since the root object is an embedded object, it delineates the content area within which an intrinsic text content associated with the root object is rendered. An example of the intrinsic text content associated with the root object is illustrated in the sentence that reads: "This is a South American iguana."

To render and manipulate this intrinsic text content of the root object, there is associated with the root object a root object editor, also known as a root editing component, representing the underlying program that manipulates object content. In the example of FIG. 1, this root object editor is shown as object editor 214 and may be implemented by, for example, a word processor.

Besides the root object, the document container is further capable of embedding, i.e., incorporating, other objects. Each embedded object, whether or not a root object, delineates a discrete, mutually exclusive content area within the compound document. Content areas are mutually exclusive because each content area only contains one type of data. By way of example, there is shown in FIG. 1 an embedded object 208, which serves to delineate the content area of the compound document that is associated with a graphic image 210. Note that only graphics data is shown in the content area associated with embedded object 208. In contrast with the root object, which represents the first level of embedding in the document container, embedded object 208 represents a deeper level of embedding.

Each embedded object has associated with it an object editor, which is used for rendering and manipulating the content that is intrinsic to that embedded object. An example of an object editor, i.e., root object editor 214, has already been discussed in connection with the embedded root object. As a further example, object editor 216 of FIG. 1 may represent the graphics object editor associated with embedded object 208 for rendering and manipulating graphics image 210 within object 208. Object editor 216 may represent, for example, a simple drawing program.

In general, each object editor has a proprietary user interface, which is typically furnished by the developer of the application program code underlying that embedded object editor. The user interface represents, among other things, the overall "look" of the content area with which an object editor is associated, the manner in which the content is rendered, as well as the manner in which editing tools are implemented. The portion of the user interface for laying out the editing tools is referred to herein as a UI container since its role, be it a menu bar, a floating palette, a dialog box, or the like, is to provide an environment for implementing editing tools.

Within object 208 of FIG. 1, there is further embedded an object 212, representing a yet further level of embedding within the document container. Embedded object 208 serves to delineate the content area associated with the text content inside it. This text content is represented by, for example, the sentence in FIG. 1 that reads: "This is a text part." Embedded object 212 has associated with it object editor 218, which is used for rendering and manipulating the text content within embedded object 212. As is apparent in the relationship between the document container, the root object, object 208, and object 212, there could be multiple levels of embedding and deeply nested contents within a compound document.

It is typically not required for object editor 218 to be the same as object editor 214, i.e., it is not required that these two object editors utilize the same underlying program. By way of example, object editor 214 may represent one particular text editing program while object editor 218 may represent another text editing program. However, it is entirely permissible for both object editors 214 and 218 to be the same application program if such is desired by the computer user. For example, object editor 214 and object editor 218 may both implement the same word processor in different embedded objects. In this case, the object editor associated with the root view as well as embedded object 212 may both have pointers to the underlying application program, thereby enabling one application program to serve both of these embedded objects.

In the compound document architecture, the data representing the text content within the root view of display area 204, the graphics content within object 208, and the text content within object 212 may be stored within a single file object 220, which exists inside the computer's persistent storage system. For example, each of object editors 214, 216, and 218 may respectively store their associated data inside a respective section of file object 220. As the document is read from storage, the data of each section may be recalled from file object 220 and rendered in the compound document within window 200 by the object editor with which the stored data in each section is associated.

If an object editor is not available for recalling and rendering/manipulating the data stored in a section of file object 220, that data is simply not displayed and is not manipulable in the compound document. However that data still resides with the document and is not destroyed or corrupted. By way of example, this situation may occur when a document, which has been created on a first computer, is moved to a second computer which lacks the appropriate object editor to recall and render some of the data. When the compound document is activated by the second computer, the embedded object that delineates the content area associated with the missing object editor may still appear. However, the content inside that object is likely a static image. In some case, the static image may simply be a gray background.

Although the non-homogenous contents of a typical compound document may appear visually seamless, the typical compound document is in fact more like a collage of embedded objects, wherein each embedded object editor is in effect a separate application program within a document framework. The disjointed nature of the typical compound document is most clearly felt during an editing session. For example, when computer users move their selection from one content area of a typical compound document to another content area, say to manipulate different pieces of data, the effect may be similar to that observed when Computer users switch among stand-alone applications in the application-centered approach in that the user interface changes. This is because in a compound document, an object editor does not operate in the content area with which it is not associated. For example, object editor 214, representing the text object editor for the intrinsic text content in the root object, typically does not get involved in rendering or manipulating the graphics images within object 208.

When a user changes object editors to manipulate different pieces of data, the user interface of the typical compound document may change completely and suddenly. This is because each object editor in the typical compound document implements its own user interface and furnishes its own set of tools with which its associated content is rendered and manipulated.

By way of example, if object editor 218 has a different user interface from that of object editor 216, the user interface will change when the computer user moves from editing the text content in embedded object 212 to editing graphics image 210 in embedded object 208. When the user interface changes, the old UI container and its editing tools are immediately replaced with a new UI container and new editing tools for editing the newly selected content. In some cases, the changes may occur suddenly and disorientingly. By way of example, sudden changes to the appearance of the traditional compound document may occur when the computer user moves from one object editor, say one having a UI container that lays out its editing tools in a red floating palette, to an object editor that lays out its editing tools in a blue menu bar.

Further, the fact that an object editor, its editing tools, and its UI container are interdependent on one another in a typical compound document also presents other problems. For one, this fact adversely impacts modularity of design and makes global changes difficult to implement. Consider the situation where a computer user wishes to globally change the pen width of all drawing tools in a compound document that employs, say five different graphics object editors. It is not possible to effect such global changes in one operation in the traditional compound document architecture since each object editor exclusively "owns" its editing tools. Therefore, the computer user must change the pen width tool provided with each object editor, i.e., make five changes, in order to accomplish this task.

Consequently, what is needed is an improved method and apparatus for processing a compound document. The improved method and apparatus preferably permit a set of editing tools to work with object editors throughout a compound document and vice versa. Further, it is preferable that the improved method and apparatus provide a substantially consistent user interface during a compound document editing session irrespective of which object editor is currently active.

SUMMARY OF THE INVENTION

The present invention relates, in one embodiment, to a compound document in a computer, which includes a first object editor embedded in the Compound document. The first object editor is used for rendering data in a first data content area of the compound document. The compound document further includes a second object editor embedded in the compound document for rendering data in a second data content area of the compound document. As mentioned earlier, the first data content area and the second data content area are mutually exclusive. In other words, each content area is used for rendering and manipulating only the data with which it is associated.

Further, there are advantageously embedded a plurality of editing controllers in the compound document for selectively editing attributes of a selection of either data associated with the first data content area or data associated with the second data content area. Attributes are descriptions of a particular selection of a content. Attributes of data include, for example, text font and text styles, if the selection is made in a text data content area. If the selection is made in a graphics data content area, attributes may include, for example, fill color and pen width.

To facilitate communication of attribute data between the editing controllers and the object editors, the compound document further includes a data switching system. The data switching is used for determining the destination editing controller(s) among all existing editing controllers for sending attribute data associated with a selection. In one embodiment, the destination editing controller(s) are ascertained based on interest registered with the data switching system by the editing controllers.

In another embodiment, the invention relates to a method for creating a compound document in a computer, which includes the steps of embedding a first object editor in the compound document. As mentioned earlier, an object editor, such as the first object editor, is used for rendering data in a data content area of the compound document. The inventive method further includes the step of embedding a second object editor in the compound document for rendering second data in a second data content area of the compound document.

The inventive method further includes the step of embedding a plurality of editing controllers in the compound document, which are used for selectively editing attributes of a selection of either the first data or the second data. Further, the method includes the step of providing a data switching system for communicating attribute data between the editing controllers and the first and second object editors. The data switching system determines which one of the plurality of editing controllers receives the attribute data based on interest registered by each of the plurality of editing controllers with the data switching system.

In accordance with ;yet another embodiment, the invention relates to a method for creating a compound document in a computer, which advantageously includes the step of providing a provider extension for use in a cooperative coupling arrangement with a first object editor. The first object editor represents an object editor provided with an existing unenhanced compound document architecture and being capable of rendering first data in a first data content area of the compound document. By way of example, the existing compound document architecture may be, in one embodiment, the aforementioned OpenDoc™.

The inventive method further includes the step of providing a patron extension for use in a cooperative coupling arrangement with a second object editor, the second object editor also represents an object editor associated with the existing unenhanced compound document architecture and being capable of rendering second data in a second data content area of the compound document. Further, there is included the step of providing an editing controller extension with an editing controller, the editing controller representing an object for editing attributes of a selection of one of the first and second data.

The inventive method also advantageously includes the step of providing a data switching system for communicating attribute data between the editing controller and the first and second object editors through the editing controller extension, the provider extension, and the patron extension respectively. The data switching system preferably determines which one of the provider and patron receives the attributes data based on interest registered by the provider and patron with the data switching system.

In yet another embodiment, the invention relates to a method of processing data in a compound document, which has an embedded object editor for rendering the data and a plurality of editing controllers embedded in the compound document. The method preferably includes the steps of detecting whether a selection is made in the data, and filling out a data structure, known as an auditor data structure, with attributes relating to the selection. Further, the inventive method includes the step of communicating the first attributes to interested ones of the editing controllers using the auditor data structure. In this manner, the auditor data structure serves as a medium through which communication of attribute data between editing controllers and object editors may be accomplished.

In yet another embodiment, the invention relates to a computer program product which includes a computer usable medium having computer readable code embodied therein for processing data in a compound document. The compound document has an embedded object editor for rendering data and a plurality of editing controllers embedded in the compound document. The inventive computer program product includes a computer readable program code configured to cause a computer to detect whether a selection is made in the data.

Furthermore, the invention advantageously includes computer readable program code configured to cause the computer to fill out a data structure, known as an auditor data structure, with attributes of the selection. The filled out auditor data structure is then used by another computer readable program code for causing the computer to communicate the attributes to interested editing controllers.

These and other features of the present invention will be presented in more detail in the following specification of the invention, the figures, and the appended claims.

BRIEF DESCRIPTION OF THE DRAWINGS

Additional advantages of the invention will become apparent upon reading the following detailed description and upon reference to the drawings, in which.

DESCRIPTION OF THE PREFERRED EMBODIMENT

It should be noted that the invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, windows, workspace, objects, or the like. It should be remembered, however, that all of these and similar terms are to be associated with the appropriate physical quantities and are merely convenient labels applied to these quantities.

Further, the manipulations performed are often referred to in terms, such as identifying, selecting, dragging, or dropping, transmitting, and the like. In any of the operations described herein that form part of the present invention, these operations are machine operations. Useful machines for performing the operations of the present invention include general purpose digital computers or other similar devices. Alternatively and equivalently, such manipulations may be partially or wholly provided in hardware logic, as will be appreciated by those skilled in the art.

Figure 1:
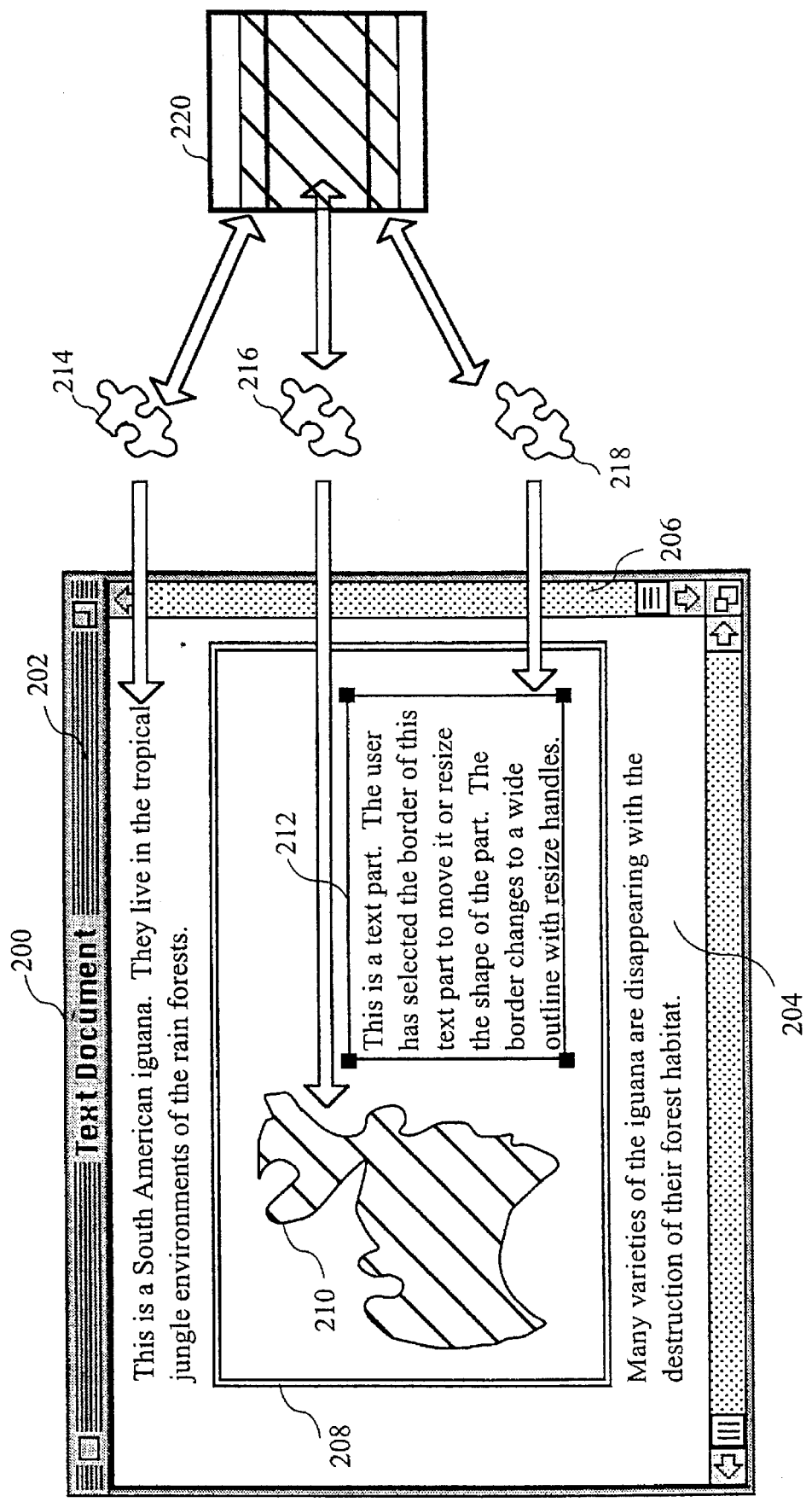
FIG. 1 shows a traditional compound document along with its various constituting elements.
Figure 2:
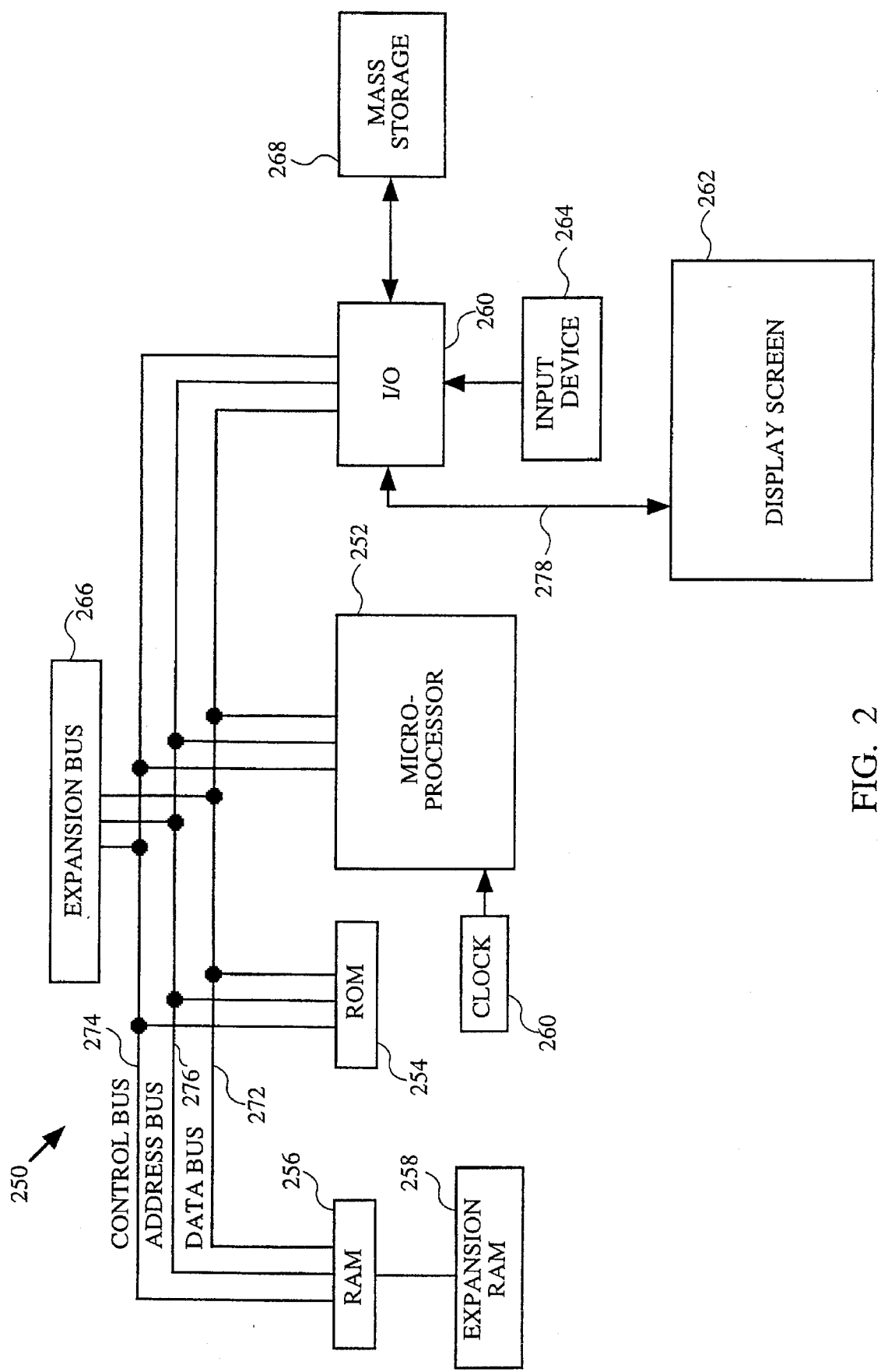
FIG. 2 shows a general purpose computer system suitable for implementing the present inventive method.

In FIG. 1, a compound document is illustrated to facilitate the earlier discussion of compound documents. FIG. 2 shows a general purpose computer system for implementing the present inventive method. Referring to FIG. 2, a computer system 250 in accordance with the present invention includes a central processing unit (CPU) 252, read only memory (ROM) 254, random access memory (RAM) 256, expansion RAM 258, input/output (I/O) circuitry 260, display assembly 262, input device 264, and expansion bus 266. Computer system 250 may also optionally include a mass storage unit 268 such as a disk drive unit or nonvolatile memory such as flash memory and a real-time clock 260.

CPU 252 is preferably a commercially available, single chip microprocessor such as one of the Intel X86 or Motorola 680XX family of chips, or a reduced instruction set computer (RISC) chip such as the PowerPC™ microprocessor available from Motorola, Inc. CPU 252 is coupled to ROM 254 by a data bus 272, control bus 274, and address bus 276. ROM 254 may partially contain the basic operating system for the computer system 250. CPU 252 is also connected to RAM 256 by busses 272, 274, and 276 to permit the use of RAM 256 as scratch pad memory. Expansion RAM 258 is optionally coupled to RAM 256 for use by CPU 252. CPU 252 is also coupled to the I/O circuitry 260 by data bus 272, control bus 274, and address bus 276 to permit data transfers with peripheral devices.

I/O circuitry 260 typically includes a number of latches, registers and direct memory access (DMA) controllers. The purpose of I/O circuitry 260 is to provide an interface between CPU 252 and such peripheral devices as display assembly 262, input device 264, and mass storage 268. Display assembly 262 of computer system 250 is an output device for displaying objects and other visual representations of data.

The screen for display assembly 262 can be a device that uses a cathode-ray tube (CRT), liquid crystal display (LCD), or the like, of the types commercially available from a variety of manufacturers. Input device 264 can be a keyboard, a mouse, a stylus working in cooperation with a position-sensing display, or the like. Alternatively, input device can be an embedded RF digitizer activated by an "active" RF stylus. Therefore, as used herein, the term input device will refer to any mechanism or device for Entering data and/or pointing to a particular location on a screen of a computer display. The aforementioned input devices are available from a variety of vendors and are well known in the art.

Some type of mass storage 268 is generally considered desirable. However, mass storage 268 can be eliminated by providing a sufficient mount of RAM 256 and expansion RAM 258 to store user application programs and data. In that case, RAMs 256 and 258 can optionally be provided with a backup battery to prevent the loss of data even when computer system 250 is turned off. However, it is generally desirable to have some type of long term mass storage 268 such as a commercially available hard disk drive, nonvolatile memory such as flash memory, battery backed RAM, PC-data cards, or the like. In one embodiment, mass storage unit 268 may include units which utilizes removable computer readable media, such as floppy disks, opto-magnetic media, optical media, and the like for the storage of programs and data. Further, the above-mentioned computer readable media may represent the media in which a program, such as that implementing the inventive apparatus and method disclosed herein, is furnished for use in the computer.

In operation, information is inputted into the computer system 250 by typing on a keyboard, manipulating a mouse or trackball, or "writing" on a tablet or on a position-sensing screen (not shown) associated with display assembly 262. CPU 252 then processes the data under control of an operating system and an application program stored in ROM 254 and/or RAM 256. CPU 252 then typically produces data which is outputted to the display assembly 262 to produce appropriate images on its screen.

Expansion bus 266 is coupled to data bus 272, control bus 274, and address bus 276. Expansion bus 266 provides extra ports to couple devices such as modems, display switches, microphones, speakers, etc. to CPU 252.

The above-discussed computer represents, in one embodiment, the apparatus suitable, for use in creating and editing the improved compound document. The inventive enhanced compound document processor (ECDP) will now be discussed in details.

In contrast with the application-centered approach or the traditional document-centered approach, a compound document created in accordance with the inventive enhanced compound document processor (ECDP) technique comprises embedded objects which have distinct functional roles relative to other embedded objects. In accordance with the ECDP approach, there are primarily three types of embedded objects: provider, patron, and editing controllers (EC's). Each compound document includes a provider, which functions as the root object of the compound document. There is typically only one provider per compound document. The provider represents an embedded object editor, also known as a component editor or an part editor, for rendering and manipulating contents that are intrinsic to the provider. As the term is used herein, rendering is typically, but not necessarily done in a visual manner on a display screen. Examples of non-visual contents which may be rendered by an object editor includes, for example, sound data. Further, contents are considered intrinsic to an object editor if that object editor is primarily responsible for rendering and manipulating the contents.

Further, a provider may embed other object editors, each of which is also capable of rendering and manipulating its own intrinsic contents. An object editor that is embedded in a provider is known herein as a patron. By way of example, a provider representing a text object editor may have embedded in it one or more graphics object editors. The text object editor may then be responsible for rendering and manipulating its intrinsic text data while a graphics object editor embedded therein may be responsible for rendering and manipulating its own intrinsic graphics images.

In the inventive ECDP architecture, the provider also represents the object which is responsible for implementing the user interface (UI) strategy for the entire compound document. This is in contrast to the traditional document-centered architecture, such as OpenDoc™ by Apple Computer, Inc. of Cupertino, Calif. or OLE by Microsoft, Inc. of Redmond, Wash., in which each embedded object is responsible for managing its own user interface. The provider in an ECDP document preferably implements the UI strategy for the entire compound document by managing a UI container, which is associated with the provider. Examples of UI containers include floating palettes, menu bars, dialog boxes, icons, and the like. It should be noted that although only one UI container is discussed herein in details for ease of discussion, an ECDP document may be associated with multiple UI containers, each of which may have a different theme or shape. In contrast to traditional document-centered approaches, however, the inventive ECDP document preferably does not provide a separate UI container for each application program that is embedded in the compound document. Instead, different object editors in an ECDP document, whether a provider or a patron, share the aforementioned UI container and a pool of attribute editing tools known as editing controllers (herein "EC").

Editing controllers represent another type of embedded object in an ECDP document and are the tools for changing the attributes of the ECDP document embedded contents. The UI container is the primary environment for laying out and presenting editing controllers (EC's) to the computer user. By way of example, an EC implemented in a container may be, in one embodiment, a button for changing text font size in a floating palette.

Since the provider manages the UI strategy of the entire compound document by managing the UI container with which it is associated, an ECDP document advantageously maintains a consistent, monolithic look and feel during an editing session. To the extent possible, the UI container and its EC's preferably remain consistent regardless which object editor is currently active. In this manner, when a computer user changes object editors, e.g., by moving from one content area to another content area, the UI container and its EC's, as well as the editing context in general, preferably remain substantially consistent. The fact that the editing context remains substantially consistent irrespective of which object editor is the current focus of user operating represents an important aspect of the present invention.

In contrast, compound documents created in accordance with the traditional document-centered approach requires that each embedded object provide its own user interface and furnish its own set of tools. The resulting compound document created using the traditional document-centered approach is therefore more like a collage of objects instead of giving the look and feel of one unified document. For example, if a computer user moves from one content area to another content area in a traditional compound document, the user interface and the set of tools may change suddenly, significantly, and possibly disorientingly. By way of example, it is not unusual for the entire user interface, including the color scheme and tool set to completely change (e.g., from red floating palette to gray menu bar) when a computer user moves from one embedded object to another embedded object in a traditional compound document.

An ECDP document advantageously maintains a consistent, monolithic look and feel during an editing session since the user interface is managed by a single entity, i.e., the provider. To further enhance the monolithic, consistent look-and-feel experience, the provider, in another aspect of the invention, may offer an application programming interface (API) for enforcing integration of user interface regarding the look of an ECDP document.

By way of example, a provider may specify that the preferred look of a particular ECDP document, say a children's drawing program, that includes a certain color scheme. Other embedded objects with multiple options for presenting themselves may then use the API established by the provider to conform the rendered embedded objects to the overall look of the document. Developers of future add-on embedded objects may also use the promulgated API to ensure that their add-on embedded objects are visually harmonious with an existing ECDP document.

In accordance with the inventive ECDP approach, object editors and EC's are decoupled. In other words, an object editor and the tools which are used to edit the attributes of its content are no longer exclusively interrelated. Many object editors can and are expected to share the same editing controllers (EC's) and vice-versa. Because object editors and EC's are completely decoupled, it is possible to keep the same set of EC's in a UI container when a computer user moves from object editor to object editor. Necessarily, there are times when a certain EC cannot edit the currently selected content. For example, when a computer user moves from a graphics object editor, say a drawing program, to a text object editor, say a word processor, and clicks on a text phrase, an EC for changing the fill color of a graphics image may no longer be applicable. If they are kept in the UI container for visual consistency, these EC's may, in one embodiment, be dimmed.

Figure 3A:
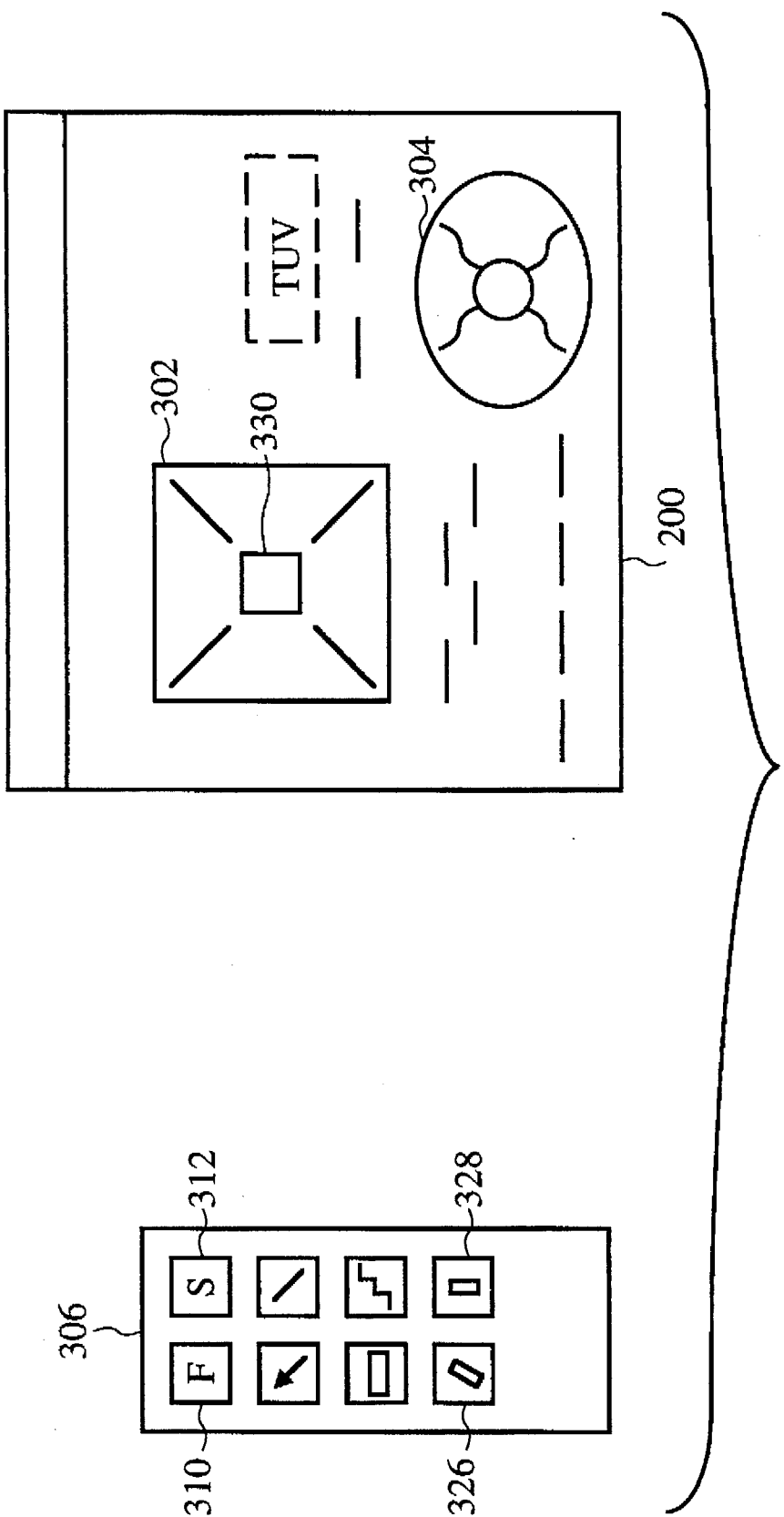
FIG. 3A shows in a visual display format a compound document created in accordance with one aspect of the inventive enhanced invention.

FIG. 3A shows in a simplified visual display format a compound document created in accordance with one aspect of the inventive enhanced compound document processor (ECDP) technique. Referring now to FIG. 3A, there is shown a window 200 within an ECDP document may reside. In the implementation shown in FIG. 3A, the boundaries of window 200 delineates an embedded object that contains the intrinsic content of the provider. By way of example, the provider may be a text object editor for rendering and manipulating the intrinsic text content. A portion of the text content which is intrinsic to the provider is shown by the letters "T U V" in window 200.

There is also shown in FIG. 3A an embedded object 302, delineating the content area of an embedded graphics object editor. The graphics object editor associated with object 302 may be used to, for example, render and manipulate the graphical content within object 302. FIG. 3A also shows an object 304, which delineates the content area associated with another graphics object editor. The graphics object editor associated with object 304 may be used to, for example, render and manipulate the graphical content within object 304.

Note that although only two embedded objects are shown in FIG. 3A for illustration purposes, a provider may have embedded in it any number of embedded objects. Further, a provider may even have no embedded objects. Further, there is no requirement that two embedded objects must implement the same object editor. For example, although objects 302 and 304 both implement graphics object editors, the graphics object editor associated with object 302 may be a different application program than the graphics object editor associated with object 304.

As mentioned earlier, each object editor of an ECDP document, e.g., the provider associated with window 200, the graphics patron associated with object 302, and the graphics patron associated with object 304, do not have individual user interfaces. Instead, there is one user interface per ECDP document, which is managed by the provider. All object editors further share a common pool of attribute editing controllers (EC's), subsets of which are displayed in a UI container for use by the computer user at any given point in time.

There is also shown in FIG. 3A a UI container 306. As mentioned earlier, the UI container is associated with the provider of the ECDP document and represents the environment within which EC's are implemented and displayed. In the example of FIG. 3A, EC's in UI container 306 are implemented as a set of buttons for selectively editing attributes of selected content within the ECDP document.

Depending on the goal of the ECDP document, UI container 306 may be furnished to the user as a fully populated tool set by a software developer. In accordance with one aspect of the present invention, however, UI container 306 may be populated by the computer user with individual EC's or sets of EC's that may be appropriate for the task which the computer user tries to accomplish. In this manner, a UI container implemented in accordance with the inventive ECDP technique may be highly configurable for performing a specific task. Note that EC's within the UI container of the inventive ECDP document preferably works with a wide range of embedded object editors. This is possible because the EC's within UI container 306 are completely decoupled from the object editors that utilize them for rendering and manipulating content.

In accordance with one aspect of the present invention, an EC and an object editor communicate according to interest types. In other words, when a portion of the content is selected, the attributes regarding that selection is received by and acted upon only by EC's that are interested in the interest type of the selection. Conversely, when an EC is manipulated to edit the attributes of a selection in an ECDP document, only those object editors that have an interest in the same interest type as the EC receive the changed attribute information. Upon receiving the changed attribute information, an object editor may, for example, render the changed attribute in its selection if appropriate.

In one embodiment, if an EC is displayed in UI container 306 but is deemed uninterested in a particular set of attribute information from a selection, that EC may dim out to indicate to the computer user that it is not available for use in editing the attributes of the selected content. By way of example, when the phrase "T U V" is selected in the root object (which is rendered and manipulated by the object editor which acts as a provider), EC buttons in UI container 306 that are responsible for changing font size and text styles may be interested and indicate themselves to be available for use. In one embodiment, EC's indicate themselves to be available by simulating the "pop up" state of buttons. Conversely, EC buttons in UI container 306 which are provided for changing the fill color of a graphics image may be uninterested and dimmed out. In this case, the font size EC 310 and text style EC 312 are deemed "active." On the other hand, pen color EC 326 and fill color EC 328 are deemed uninterested and inactive since EC's 326 and 328 are incapable of manipulating the selected text content. Additional information regarding behaviors of EC's when active and inactive, reference may be made to, for example, a publication entitled "Macintosh Human Interface Guidelines" (Addison-Wesley Publishing Company, 1992), or a similar publication entitled "Microsoft Windows Software Development Kit; The Windows Interface: An Application Design Guide" (Microsoft Corporation, Redmond, Wash., 1992), both of which are incorporated herein by reference for all purposes.

To further elaborate on the responses of EC's when a portion of the content is selected, consider the situation when a graphics image 330 embedded in object 302 is selected as a target of user operation. When graphics image 330 is selected, the graphics object editor associated with object 302 becomes the active object editor. If the computer user has moved from the previously selected text "T U V" to graphics image 330, the user has effectively moved across object editors, i.e., from a text object editor to a graphics object editor.

In the traditional document-centered approach, the movement across object editors most certainly result in the invocation of a different user interface and a different set of tools. This is because each object editor in the traditional document-centered approach exclusively manages its own user interfaces and exclusively employs its own set of tools for manipulating its content. There is no mechanism in the traditional document-centered architecture for robustly permitting object editors to share editing tools.

In contrast, UI container 306 in the ECDP document implemented using the inventive ECDP approach preferably remains substantially the same when the computer user moves his or her selection from one object editor to another object editor. Although some EC's may dim out and/or other EC's may be substituted in, it is preferable that the user interface and much of UI container 306 remain consistent across object editors.

Figure 3B:
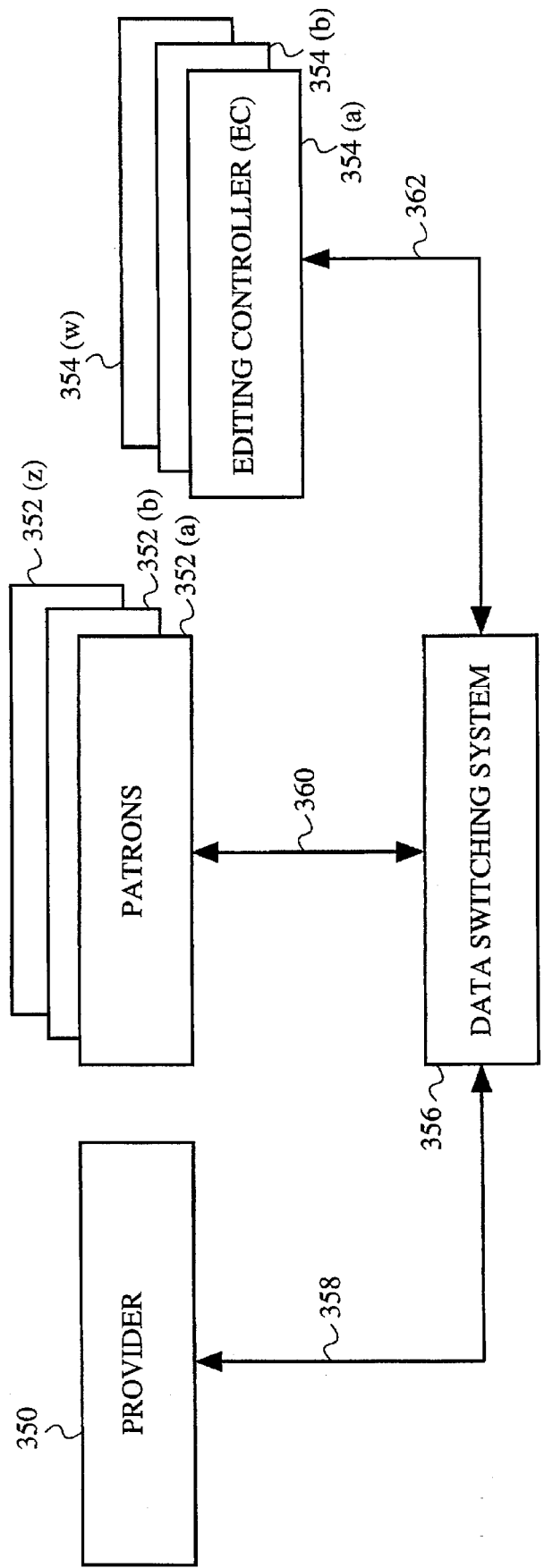
FIG. 3B shows the architecture of the inventive enhanced compound document processor (ECDP) in accordance with one aspect of the present invention.

FIG. 3B shows in a simplified diagram format the architecture of the inventive enhanced compound document processor (ECDP) in accordance with one aspect of the present invention. In one embodiment, the inventive enhanced compound document processor (ECDP) includes a plurality of embedded objects, each of which is assigned a discrete functional role relative to one another. As mentioned earlier, there are primarily three types of embedded objects: provider, patron, and editing controllers (EC's). Embedded objects relate to one another in a manner that is dependent on their assigned functional role in the document. In one embodiment, the embedded objects themselves communicate through a notification system that is based on interest types. In other words, an embedded object only receives and responds to a particular piece of attribute data if that embedded object has indicated earlier that it is interested in that type of attribute data.

In accordance with a further aspect of the invention, the notification system preferably utilizes a data structure which is capable of representing the characteristics and attributes of a selection of the selected content and, in a dynamic manner, communicates those attributes or characteristics to other embedded objects which may be interested in receiving and responding to such attribute information. In contrast, embedded objects in the traditional compound document architecture neither receive nor respond to attribute information regarding the selected contents of other embedded objects. This is because, as mentioned earlier, typical compound document strategies are primarily interested in the visual appearance or the layout of information in the compound document in the screen, and not the relationship between the embedded objects.

Referring now to FIG. 3B there is shown a provider 350, which is associated with the root object edit, or for rendering and manipulating the contents of the root object. Provider 350 further represents an embedded object that is responsible for managing the user interface as well as implementing the user interface strategy. As shown in FIG. 3B, there is typically only one provider per enhanced compound document.

FIG. 3B also shows a plurality of patrons 352(a)–(z), representing the content engines or content models for rendering and manipulating the contents within various embedded objects. There are typically multiple patrons in an enhanced compound document although this is not necessary. Each patron has associated with it an object editor for manipulating data of a like type. For example, a patron 352(a) may implement a text editor for editing text in one embedded object in the document while another patron 352(b) may implement a graphics editor for rendering and manipulating graphics images in another embedded object in the same document.

FIG. 3B also shows a plurality of editing controllers (EC's) 354(a)–(w), representing the editing tools for manipulating the attributes of the contents rendered by patrons 352(a)–(z). For example, if a patron 352(a) implements a word processor, an EC 354(a) may implement, for example, a button that bolds a selection of text within the embedded object associated with that patron. As a further example, if a patron 352(b) implements a graphics editor for rendering and manipulating graphical objects, an EC 354(w) may implement a "change line width" button for changing the width of a line selected in the embedded object associated with that patron.

Note that a patron may have more than one EC associated with it. For example, a word processor may have, among others, EC's for implementing bolding, underlining, changing fonts, displaying the font currently active, and the like. In accordance with one aspect of the present invention, an EC may serve one or more patrons. For example, if there are two patrons 352, and each of them implementing a different word processor, a single EC 354 implementing a bolding feature may be able to service both patrons.

If a certain object editor is used multiple times, either in one enhanced compound document or in multiple enhanced compound document, there is typically no need to have multiple copies of that object editor in the computer memory space. Typically, there is provided a pointer from each embedded object editor to the object editor codes for permitting the same set of object editor codes to serve more than one patron.

An EC and a provider are related to one another by a containment concept that is part of the enhanced compound document processor architecture. In the ECDP, an EC is preferably associated with the provider, not with individual object editors of the enhanced compound document. Further, it is not necessary that an EC has to be physically located within the boundaries of a provider to be contained by it. An EC may be physically separated from a provider and still be considered logically contained by it. In one embodiment, a provider may have a list of EC's that it logically contains. One of the EC's in the list may be located outside of the window implementing the provider and still be considered logically contained by that provider.

It should be noted that in the enhanced compound document processor architecture of the present invention, providers, patrons, and EC's are decoupled from one another. In the enhanced compound document processor of the present invention, there is, in one embodiment, no direct communication between a provider (such as provider 350), a patron (such as one of the patrons 352(a)–(z)) and an editing controller (such as one of the EC's 354(a)–(w)) without going through data switching system 356. Referring to FIG. 3B, each of provider 350, patrons 352(a)–(z), and EC's 354(a)–(w) communicate with a data switching system 356. Through data switching system 356, communication among provider 350, patrons 352(a)–(z), and EC's 354(a)–(w) are then enabled. In one embodiment, each of provider 350, patrons 352(a)–(z), and EC's 354(a)–(w) has a pointer to data switching system 356 to facilitate communication between it and data switching system 356.

In accordance with another aspect of the present invention, data switching system 356 further includes a user interface notification mechanism for facilitating communication between object editors and EC's. In one embodiment, the user notification mechanism within data switching system 356 permits object editors and EC's to communicate based on interest types. To further elaborate on interests, consider the examples below. A text object editor (e.g., a word processor) and a text EC (e.g., a button for bolding text) are, in one embodiment, essentially two embedded objects that both have interest in text. In a similar manner, a graphics object editor (e.g., a CAD package) and a graphics EC (e.g., a button for changing the fill color) are, in one embodiment, essentially two embedded objects that both have interest in graphics.

The enhanced compound document processor of the present invention preferably utilizes a notification system which passes a data structure among the embedded objects for facilitating communication of attribute information. The data structure in the notification system may be used, for example, to inform interested EC's regarding the attributes of a selection within an object editor. Further, the data structure of the notification system may also be used to communicate changed attribute data from an EC to an object editor so that the changed attribute may be rendered.

In accordance with one embodiment of the present invention, the attribute data relating to a selected content is broadcasted to every EC's. By way of example, if a computer user in a word processor selects a line of text in an object editor, the attributes regarding the selected line of text may be sent to every embedded EC's of the enhanced compound document architecture. Only those EC's which are interested in attribute data relating to the selected content may then be updated.

In accordance with another embodiment, however, the attribute data relating to the selected content is sent only to EC's that have expressed an interest in receiving attribute data relating a particular kind of content. An EC may be express its interest in, for example, attributes relating to textual contents (such as an EC for changing fonts), in graphics contents (such as an EC for changing the fill color), or sound contents (such as EC for changing the musical scale in a piece of recording). When communication is facilitated only among embedded objects which are interested, the communication is said to be interest-based. By way of example, if a computer user in a word processor selects a line of text in an object editor, the attributes regarding the selected line of text would only be sent to and updated with interested EC's from that object editor via a data switching system. Interested EC's are those which have expressed an interest in receiving text attribute data. One of such EC's in the above example may be, for example, a text font EC. A graphics EC such as an EC for changing the fill color of a graphics image would probably not have registered its interest in text attribute data and therefore not be sent the text attribute data for updating. Conversely, when a graphics EC representing an EC for changing the fill color of a graphics image is manipulated, say to change the fill color from red to blue, only the object editors that have registered their interest in receiving graphics attribute data receive and respond to the changes in the fill color attribute.

In accordance with a further aspect of the present invention, a data structure for use by the data switching system preferably utilizes data types that are primitive and native to the programming languages, e.g., long integers, short integers, string, enumerated lists, and the like. By using very primitive and native data types to describe the attributes of selected contents, a data structure may be made generic to all EC's and object editors. In other words, such a generic data structure would be compatible with most object editors and EC's because any attribute characteristics that require communication between object editors and EC's may be broken down into data types that are primitive and native to the computer language of the computer. For further information regarding the genetic data structure, reference may be made to the commonly-assigned, co-pending patent application entitled "Auditor Data Structures", filed on even date and incorporated herein by reference for all purposes.

Figure 3C:
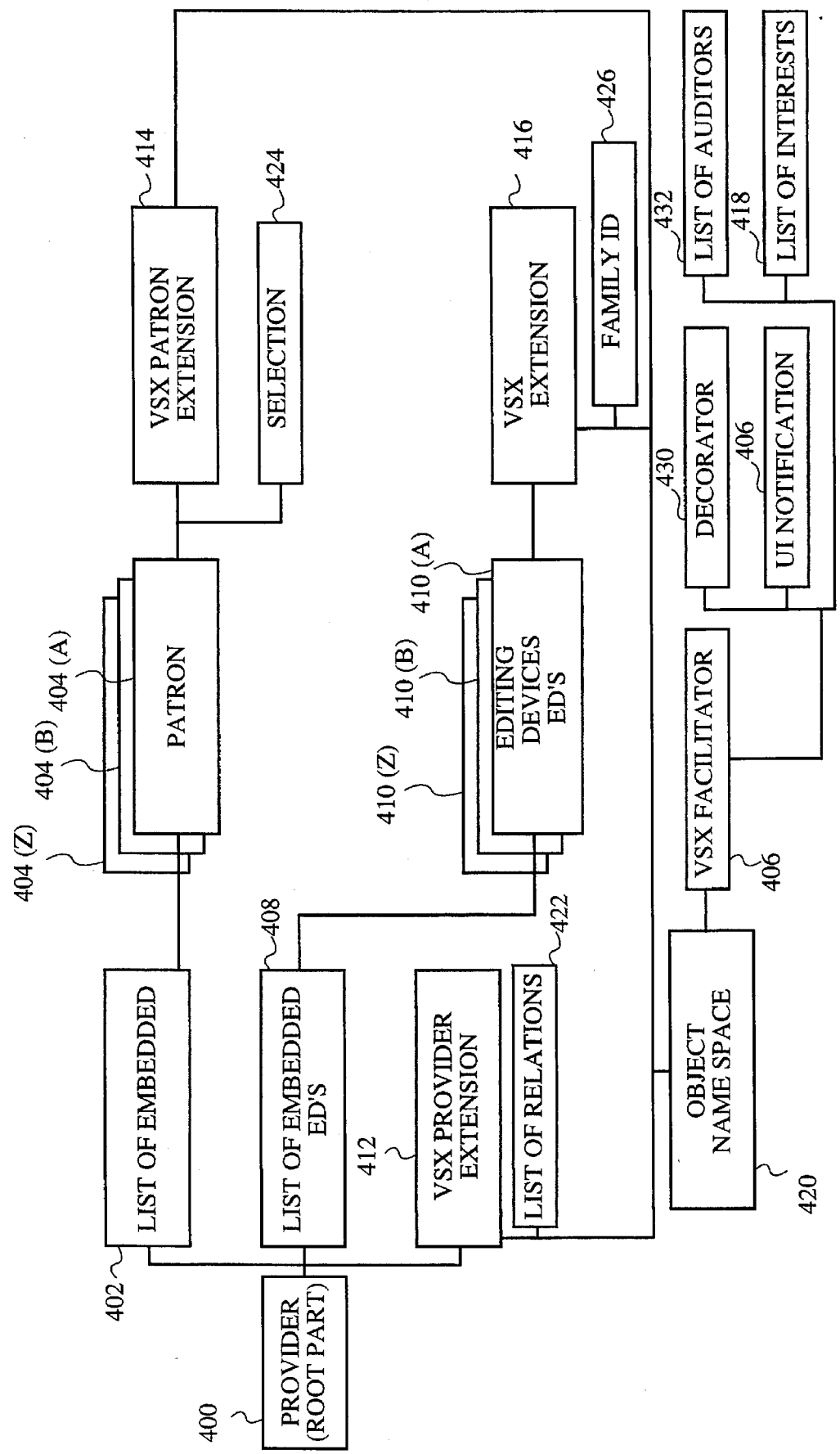
FIG. 3C shows the major components of an enhanced compound document processor implemented in accordance with one aspect of the present invention as an extension to the OpenDoc™ compound document architecture.

FIG. 3C shows the major components of an enhanced compound document processor implemented in accordance with one aspect of the present invention as an extension to OpenDoc™. OpenDoc™ is a compound document architecture manufactured by Apple Computer, Inc. of Cupertino: Calif. For further information regarding OpenDoc™, reference may be made to the available OpenDoc documentation, including, for example, a publication entitled "OpenDoc Class Reference for the Macintosh" (Developer Press, 1994) by the aforementioned Apple Computer, Inc. For information regarding OpenDoc™ or to extensions thereof, reference may be made to, for example, the documentation included herewith as Appendix A. Referring now to FIG. 3C, there is shown a root object 400, which is assigned the role of a provider for managing the user interface strategy of the document. In one embodiment, a provider is simply an object editor that is embedded first in the root view of the enhanced compound document.

Provider 400 has associated with it a list of embedded objects 402. As mentioned earlier, each embedded object delineates a content area within which data of a like type may be rendered and manipulated by an embedded object editor. The patrons associated with the embedded objects in list of embedded object 402 are shown as patrons 404(a)–(z). There are preferably as many patrons 404 as there are embedded objects in list of embedded objects 402. Note that a patron, such as one of patrons 404(a)–(z), has a discrete functional role within the enhanced compound document relative to a provider or embedded EC's. In accordance with one aspect of the present invention, each embedded object, e.g. a patron or a provider, no longer has to perform all the functions expected of a stand-alone application program. For example, no single embedded object in the ECDP has perform all the functions of managing the UI strategy (a provider function), providing the editing tools (an EC function) as well as providing a logical framework within which content may be rendered and manipulated (an object editor function). In one embodiment, an embedded object of the inventive ECDP may be predefined either as a patron, an editing controller (EC), or a provider. Upon being embedded, that embedded object may register its role with a VSX facilitator 406, thereby allowing facilitator 406 to forward appropriate attribute messages to it.

Provider 400 further has associated with it a list of embedded, EC's 408. Each embedded EC (known by the nomenclature "widget" in the VSX word) in the list of embedded EC's 408 represents an EC associated with provider 400. It should be noted that the inventive ECDP preferably associates EC's the provider and not with each patron on a piecemeal basis as in the case of the typical compound document. In FIG. 3C, the EC's associated with provider 400 are shown as EC's 410(a)–(z). Since list of embedded object 402 and list of embedded EC's 408 are persistently associated with the provider, the enhanced compound document created in accordance with the inventive ECDP technique may be stored and recalled with the appropriate pointers to the patrons and EC's that the computer users has embedded in an enhanced compound document. In this manner, an enhanced compound document may be stored and recalled for editing over many sessions.

Note that since the embedded object editors and the EC's are completely decoupled in the enhanced compound document processor of the present invention, it is necessary for provider 400 to keep separate lists of embedded objects (402) and embedded EC's (408). Provider 400 further has associated with it a. VSX provider extension 412. The extension serves to extend the functionality of OpenDoc™ Provider 400 to enable the provider (the root part in OpenDoc™) to implement the enhanced compound document processor functionalities of the present invention. Further, each of OpenDoc™ patrons (for example, patron 404A) has associated with it a VSX patron extension 414 for enabling the OpenDoc™ object editor to implement the enhanced compound document processing technique of the present invention. Similarly, each of the OpenDoc™ EC's, e.g., EC 410, also has associated with it a VSX EC extension 416, enabling the OpenDoc™ embedded editing controller to implement the enhanced compound document processing technique of the present invention. In one embodiment, patrons 404(a)–(z), EC's 410(a)–(z), and provider 400 communicate with VSX facilitator 406 (and thereby to one another indirectly) through their respective extensions.

Further, in accordance with one aspect of the present invention, the enhanced compound document processor advantageously utilizes facilities provided by the existing OpenDoc™ platform to efficiently implement interpart communication. For example, there is shown in FIG. 3C a facility called ObjectNameSpace 420, which represents a facility provided by OpenDoc™. FIG. 3C further shows VSX facilitator 406 being coupled to ObjectNameSpace 420. VSX patron extension 414, VSX provider extension 412, and VSX EC extension 416 then advantageously utilize ObjectNameSpace facility 420 to communicate with VSX facilitator 406. In other words, communication between one of provider 400 (via VSX provider extension 412), patron 404 (via VSX patron extension 414) and EC 410 (via VSX EC extension 416) and VSX facilitator 406 are advantageously facilitated via ObjectNameSpace facility 420. For further information regarding the ObjectNameSpace facility, reference may be made to the aforementioned OpenDoc™ documentation.

As mentioned earlier, there is no direct communication between provider 400, patrons 404(a)–(z) and EC's 410(a)–(w). All communication between these embedded objects is made through their respective extensions via VSX facilitator 406. VSX facilitator 406 may therefore be thought of as a switching device that serves to direct communication among provider 400, patrons 404(a)–(z), and EC's 410(a)–(z). By way of example, if a patron 404(a) needs to know which embedded object functions as the provider, patron 404(a) can look, via its associated VSX patron extension 414, into the database associated with VSX facilitator 406 to find out which embedded object has registered itself with VSX facilitator 406 as a provider. In this example provider 400, upon being embedded, would have registered its status as a provider with VSX facilitator 406. VSX facilitator 406 then notifies patron 404(a) (via VSX patron extension 414) that provider 400 is indeed the provider in charge.

In accordance with another aspect of the present invention, patrons, editing controllers (EC's), and a provider communicate with one another through their respective extensions using one or more data structures, called auditor data structures. Auditor data structures serve as a common language through which attribute data relating to a selected content may be passed among embedded objects and understood by all. For example, a text object editor and a text EC for editing textual attributes may utilize an auditor data structure which is specially adapted for communicating between them textual attributes such as text type, font sizes, and the like. As a further example, a graphics object editor (graphics patron) and an EC for editing graphics attributes may communicate with one another using an auditor data structure which is specially adapted for communicating graphics attributes such as fill color, pen with, fill pattern, and the like.

As mentioned earlier, however, it is possible to use a generic auditor data structure instead of specialized auditor data structures to communicate among all object editors and EC's. By using generic auditor data structures, the inventive enhanced compound document processor (ECDP) advantageously permits patrons, EC's, and providers that may be previously unknown to one another to be embedded in an enhanced document and to communicate among one another without knowledge of each other's content model. For further information regarding the composition and use of a generic auditor data structure in a compound document setting, reference may be made to aforementioned commonly assigned, co- pending patent application entitled "Auditor Data Structures" having a pending U.S. patent application Ser. No. 08/441,883.

In this manner, an enhanced compound document may be created with, say, a text object editor as a first object editor. The computer may then utilize a set of editing controllers associated with the compound document for editing the text content attributes. If additional editing tools are desired, the computer user may then add or remove EC's during the editing session as appropriate to the task. Note that if the newly added editing tools can understand the attributes of a selection (via, e.g., an appropriate auditor data structure), it is immaterial whether the EC's and the object editor are furnished by the same or different developers.

A additional object editor may also be embedded whenever desired, which may then use some of the already embedded editing tools for editing the attributes of its selected content. As an example, suppose a computer user would like to create a graphics image in an existing compound document that did not already have a graphics object editor embedded. In one embodiment, the computer user may drop into the appropriate place in the enhanced compound document a graphics patron to begin rendering and manipulating graphics images. If that computer user wishes to edit the attributes of a selected graphical object therein, he or she may choose among the already embedded EC's the ones which are applicable to the graphics editing task. EC's which are applicable are those which, upon being embedded, register their interest in receiving and responding to graphics attribute data. If a particular graphics EC has not already been embedded, the computer user may then embed it in the document to use it for editing the graphics image attributes. In this manner, an enhanced compound document manipulating session may begin with only one or a few preset object editors and additional object editors may be added at the appropriate places in the enhanced compound document as need arises. EC's may also be embedded when their functionalities are desired and have their interests registered with the data switching system in order to enable the computer user to use those functionalities throughout the entire document where applicable. This is in sharp contrast to the typical compound document strategy in which editing tools may only be associated with a specific object editor.

Since EC's and patrons are completely decoupled, the computer user has the option of either embedding or not embedding EC's. Therefore, the inventive ECDP technique advantageously permits an enhanced compound document to be flexibly created and reconfigured in a dynamic manner during the editing session to meet the user needs. If a computer user only use a small set of EC's consistently to accomplish a given task, the inventive ECDP technique permits the creation of a solution in the form of a compound document that embeds only that small set of editing tools. Advantageously, software packages may be made more compact, i.e., not saddled with unwanted editing controllers, and more closely tailored to the user's needs.

EC's and object editors may be embedded dynamically in accordance with one aspect of the present invention. This is possible because the attributes of the contents associated with the various objects need not be known at compile time. The present invention, using an appropriate auditor data structure, advantageously queries the attributes of a selection of the content and communicates those attributes to EC's that are interested in those attributes. When a computer user manipulates an editing controller (EC), the attributes represented by the data fields in an auditor data structure are modified and the changed attributes are then communicated back to the object editor (e.g., provider or patron) wherein the rendering of the selected contents would be correspondingly changed.

FIG. 3C also shows, in accordance with yet another aspect of the present invention, a list of relations 422 associated with provider 400. List of relations 422 allows provider 400 to rank all embedded objects in its associated list of embedded objects 402 relative to a particular goal. In other words, list of relations 422 represents the relationship between provider 400 and each of patrons 404 (a)–(z)) relative to a particular goal that a computer user tries to achieve using the enhanced compound document. By way of example, if provider 400 is a tax preparation program, an embedded calculator, representing a patron, is probably not as strongly related to the embedded financial data as an embedded spreadsheet patron. List of relations 422 therefore facilitates a ranking of the relative importance of the embedded patrons.

FIG. 3C also shows a selection facility 422, implementing an object editor concept for representing the portion of the content that is currently the target of user operation. Since each object editor may define selection differently for its editable content, a selection facility 424 may advantageously be provided for each of patrons 404 (a)–(z). On the other hand, several patrons may share the same selection facility 424 if their methods of defining a selection is substantially similar.

The portion of the embedded content that is selected by selection facility 424 may then have its attributes communicated the interested EC's for possible display and editing. The remaining items of FIG. 3C may best be understood with reference to a specific example. If a phrase in a text object editor, say a word processor, is selected, its font attributes may be represented by data types in an auditor data structure. That auditor data structure then traverses from patron 404 to VSX patron extension 414 to ObjectNameSpace facility 420 and VSX facilitator 404.

UI notification 414 is a one-to-many broadcasting system that uses interest type as a key to select target objects. UI notification 414, in one embodiment, contains two classes: notifier (output) and receiver (input). Every EC, patron, and provider is associated with a receiver and a VSX facilitator, e.g. VSX facilitator 406, is associated with a notifier.

From VSX facilitator 406 the present invention finds out through list of interests 418 about the EC's that are interested in the font attributes of the selection. For further information relating to list of interest, reference may be made to, for example, the aforementioned co-pending patent application entitled "Auditor Data Structures". Once the EC's which are interested in the font attributes of the above example are ascertained, the auditor data structure containing the font attributes then traverses from VSX facilitator 406 through ObjectNameSpace 420 and the appropriate VSX EC extension 416 to the appropriate EC's in EC's 410(a)–(z). FIG. 3C further shows, in accordance with yet another aspect of the present invention, a family ID 426 associated with each EC. Family ID 426 represents a method of indicating relationships between EC's. In one embodiment, EC's having the same family ID may preferably be managed together through, for example a dialog box. As a further example, the computer user may have chosen a set of EC's, all of which having the same family ID but are too numerous to display all at once in a UI container on a display screen. Consequently only some, but not all, EC's chosen by the computer user may be shown in the UI container at any given time. Since those EC's have the same family ID, they may be recognized as being related. As such, a computer user may be able to scroll through them to view and pick those that are relevant to the task at hand.

In accordance with yet another aspect of the present invention, there is provided a decorator facility 430 associated with VSX facilitator 406. Decorator facility 430 represents, in one embodiment, a specialized or generic auditor data structure which contains guidelines regarding the current appearance of an enhanced compound document. A decorator facility represents a way of describing visually changeable attribute of a provider, a patron, or an EC and may be used by an embedded object when rendering its own user interface/metaphor element in its object. By way of example, a decorator may specify a general color scheme, shadow color, highlight color, and the like of an enhanced compound document. By way of example, a provider may specify that the preferred look of a particular ECDP document, say a children's drawing program, should include a certain color scheme. Other embedded objects with multiple options for presenting themselves may then use the application programming interfaces (API's) established by the provider to conform the rendered embedded objects to the overall look of the document. Developers of future add-on embedded objects may also use the promulgated API's to ensure that their add-on embedded objects are visually harmonious with an existing ECDP document.

As mentioned previously, embedded objects in an enhanced compound document may communicate among one another using one or more auditor data structures. Multiple auditor data structures may be provided in an enhanced compound document and be associated with a data switching system since certain auditor data structures may be more efficient at communicating certain attribute information. For example, it may be more efficient to utilize a specialized auditor data structure to communicate textual information than to use a larger generic auditor data structure that may be capable of communicating the attributes of both textual and graphics information. Further, when multiple auditor data structures are used to communicate the same attribute information of a given selection, the probability that the attribute information will be understood by its intended target objects are improved. Consequently, in accordance with one aspect of the present invention, the enhanced compound document processor of the present invention includes a list of auditors 432. List of auditors 432 is usually, but not necessarily, associated with VSX facilitator 406 from which an object editor may select one or more auditor data structures for communication with its EC's.

In one embodiment, it is contemplated that auditor data structures may be associated with object editors directly. In this case, object editors may have readily associated with them auditor data structures for filling out and for sending to interested EC's when a selection is made in the content.

Further, since the embedded objects are completely decoupled yet capable of communicating with one another, providers with radically different ways of implementing the UI strategy may utilize the same set of object editors and EC's. Conversely, object editors and EC's that may not know about each other's content models may be embedded in an enhanced compound document and be expected to communicate. Because of this flexibility, the inventive ECDP advantageously permit both end users and suppliers of embedded objects to leverage their investments since a given EC or object editor, once purchased or created, could be embedded in a wide variety of solution packages.

It should be noted that although extensions are discussed herein as a way to implement the inventive ECDP on top of an existing traditional compound document architecture, any discussion in connection therewith is also equally applicable to an implementation of the ECDP in the absence of an existing traditional compound document platform. For example, if an ECDP is implemented without reference to an existing compound document platform, embedded objects and their respective extensions may be simply be created as a single unit. While the use of facilities such as OpenDoc's ObjectNameSpace or comparable OLE facility are disclosed herein, it is specifically contemplated that an ECDP independent of those existing facilities may be created by one of ordinary skill in the art given this disclosure.

Figure 3D:
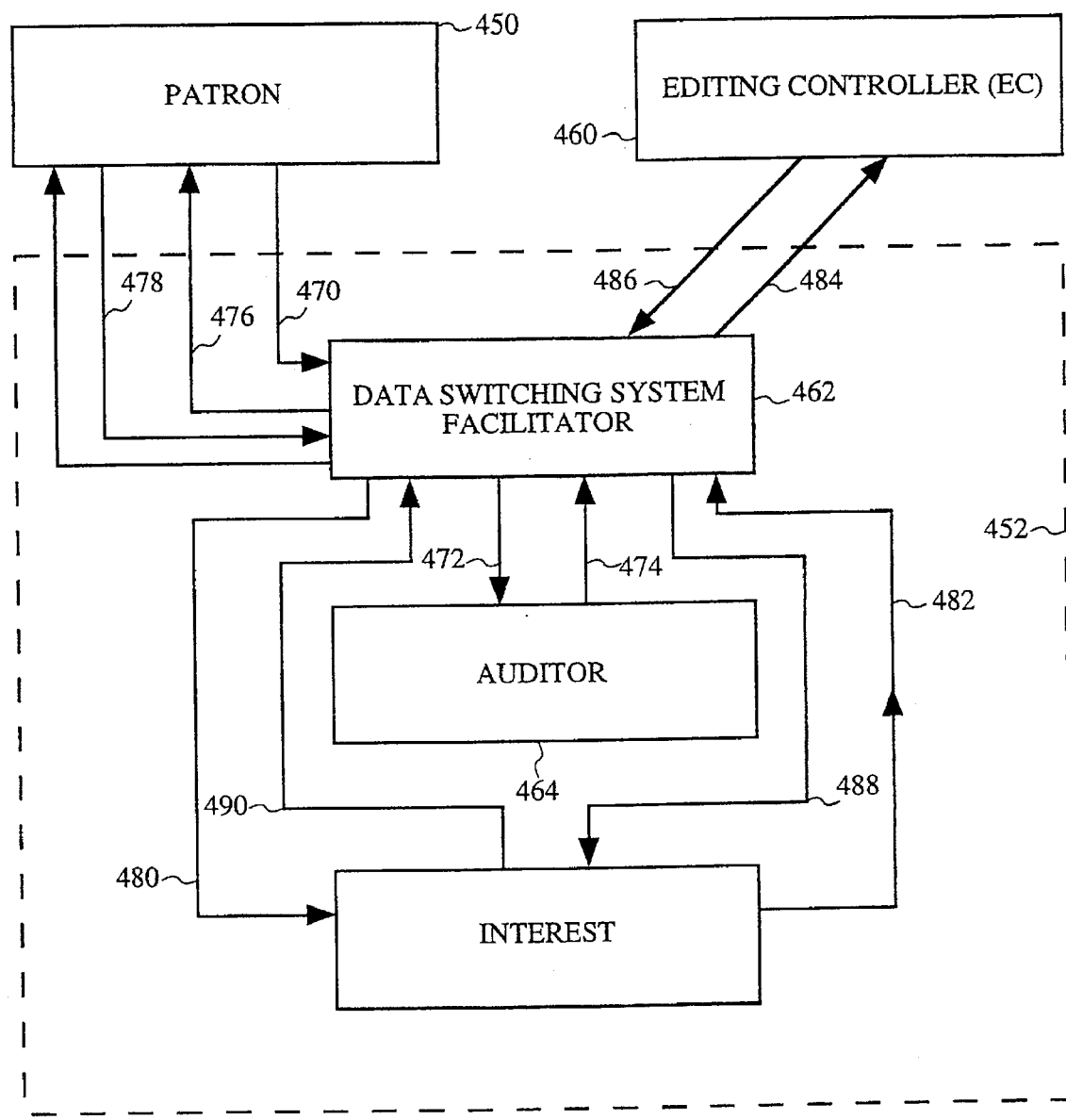
FIG. 3D shows the communication paths between a patron, an editing controller (EC), and a data switching system during updates of EC's and object editors.

FIG. 3D shows in a simplified diagram format the communication paths between a patron 450, an EC 460, and a data switching system 452 during updates of EC's and object editors. Within data switching system 452, there is shown a facilitator 462, a list of auditors 464, and a list of interests 466. When a portion of the content associated with patron 450 is selected, patron 450 may, in one embodiment, communicate with facilitator 462 via path 470 to request one or more auditor data structures that may be appropriate for communicating the attributes of the selected content. Responsive to a request from patron 450, facilitator 462 consults list of auditors 464 via a path 472. From list of auditors 464, one or more auditor data structures are then obtained via path 474 to be passed back to the requesting patron 450 via a path 476. Patron 450 then fills out the data fields of the auditor data structure(s) obtained from the facilitator 462 and returns the filled out auditor data structure to facilitator 462 via path 478 to be broadcasted to the interested EC's.

It should be noted that the step of obtaining one or more auditor data structures mentioned above is optional and may be omitted in some embodiment. For example, if the object editors have associated with them auditor data structures, there is typically no need to obtain the same from facilitator 462. In one embodiment, object editors have pointers to auditor data structures, enabling object editors to bypass the step of obtaining auditor data structures from facilitator 462.

Upon receiving the filled out auditor data structure(s) from patron 450, facilitator 462, in one embodiment, consults list of interests 466, using paths 480 and 482 respectively, to ascertain the EC's that have registered their interests in receiving attribute data relating to the data type of the selected content. Once the interested EC's are ascertained, facilitator 462 then forwards the filled out auditor data structure received from patron 450 to the interested EC's. In the example of FIG. 3D, EC 460 represents an EC that has expressed interest in the selection.

When a computer user wishes to change the attribute(s) of the selected content, he or she may manipulate controls in EC 460 to edit those attributes. For example, if patron 450 represents a word processor, the selected content may represent a block of text and the attributes may represent, for example, the text style. If the computer user wishes to change the text style from, say bold to underlined, the computer user can manipulate controls within EC 460 to make the appropriate attribute changes. The attribute changes are then reflected in the data fields of the auditor data structure which is then passed back to facilitator 462 via path 486. Again, facilitator 462 consults list of interests 466, via paths 488 and 490 respectively, to ascertain the object editors that have registered their interests in the type of attribute data represented by the auditor data structure. In this example, patron 450 represents a patron that has previously expressed an interest in text attributes. Once the interested patrons are ascertained, the auditor data structure which contains the changed attribute data are then passed back from facilitator 462 to patron 450 wherein patron 450 renders the changed attributes by modifying its selected content.

Typically, there may be a plurality of object editors that have expressed their interest in receiving and responding to a particular type of attribute data. However, there is typically only one active object editor in an ECDP document at any given time. In one embodiment, the received text auditor data structure is sent by facilitator 462 to only the object editor that both has expressed an interest in receiving text attribute data and represents the active object editor. In another embodiment, however, facilitator 462 may send the received text auditor data structure to more than one text object editor that have expressed their interest in receiving and responding to text attribute data, irrespective of whether the receiving text object editor is being active. When so implemented, attribute changes may advantageously be applied throughout the enhanced compound document without regard to which interested object editor is currently active.

Figure 4:
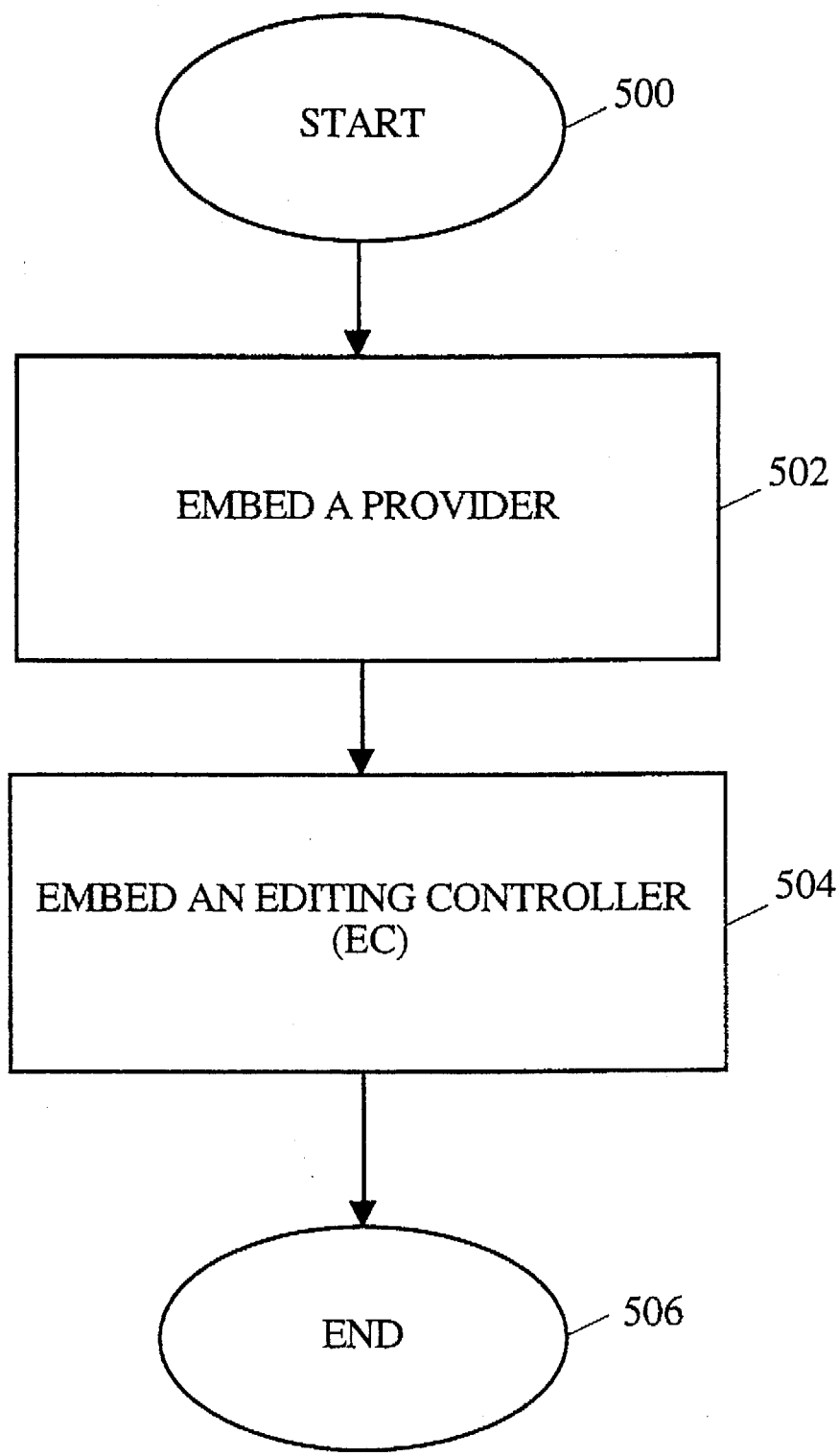
FIG. 4 is a flowchart illustrating the steps involved in creating an enhanced compound document in accordance with one aspect of the present invention.

FIG. 4 shows in a simplified flowchart format the steps involved in creating an enhanced compound document in accordance with one aspect of the present invention. FIG. 4 starts at block 500. From block 500, the method proceeds to block 502 wherein the computer user embeds a provider. The computer user may embed a provider in an enhanced compound document by selecting an object editor that is capable of functioning as a provider and incorporating that object in an existing document container. In one embodiment, embedding is preferably accomplished by a drag-and-drop operation using a screen pointer device such as a mouse, a trackball, a trackpad, or the like. In another embodiment, embedding may be accomplished by specifying via a keyboard command or a menu selection of the object editor that is desired. Upon embedding, the provider may register itself with the data switching system of its desire to be the provider in charge if there has not already been a provider.

From step 502, the method proceeds to step 504 wherein the computer user embeds an EC. Again, embedding is preferably accomplished by a drag-and-drop operation using a screen pointer device such as a mouse, a trackball, a trackpad, or the like. As mentioned earlier, embedding may be also be accomplished via a keyboard command or a menu selection of the EC that is desired. Note that it is not necessary that the EC embedded in block 504 know about the content models of the provider in block 502. The attributes of a selected content is preferably represented by data fields in the aforementioned auditor data structure using data types that both the patron and the EC may understand. Optionally, the computer may embed one or more patrons in the enhanced compound document. Functionally speaking, the communication between a provider and an EC is substantially similar to the communication between a patron and an EC since both provider and patron are object editors. From block 504, the method proceeds to block 506 wherein the steps of FIG. 4 end.

Figure 5A:
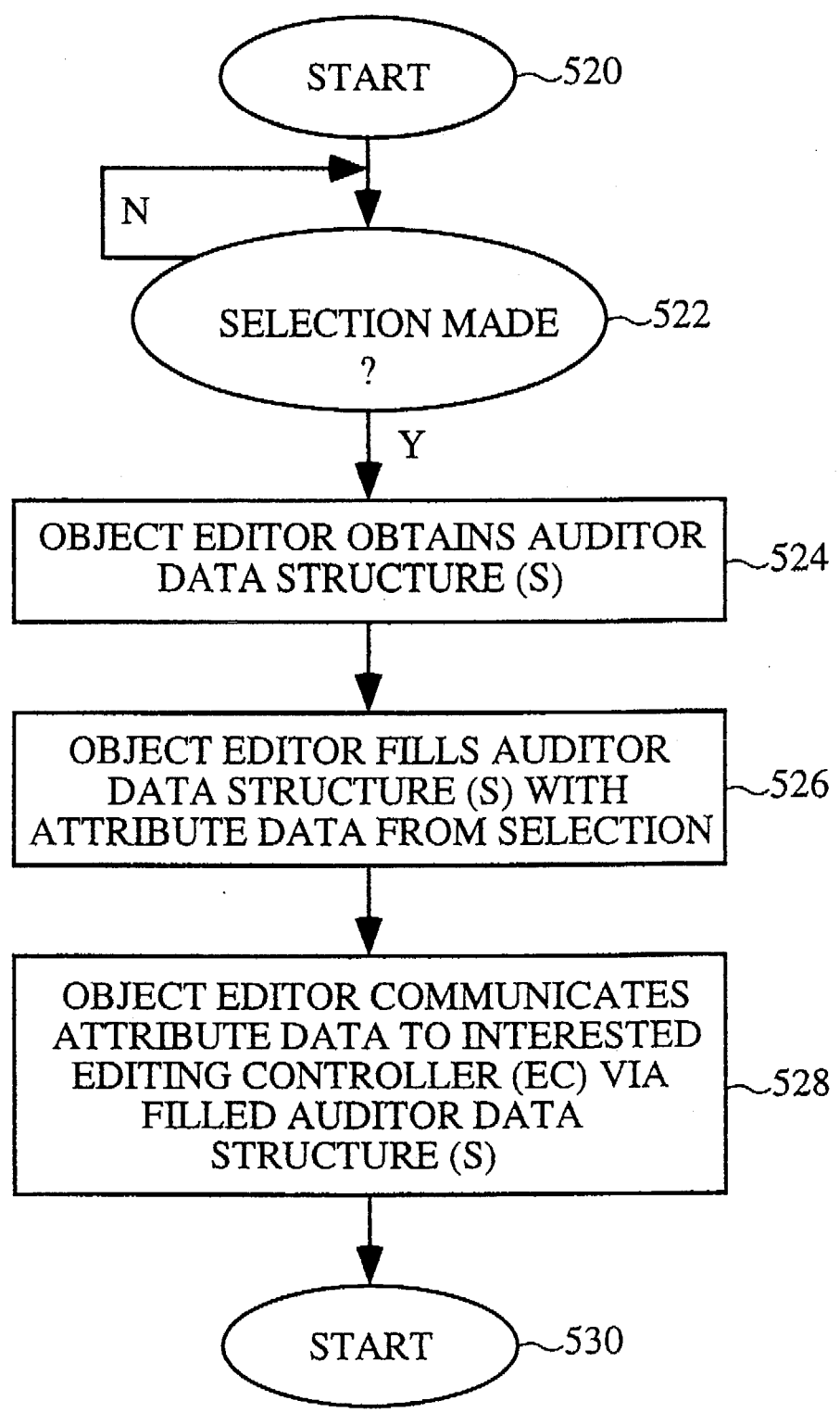
FIG. 5A is a flowchart illustrating the steps taken by an object editor in communicating the attributes of a selected portion of the content to an interested EC in accordance with one aspect of the present invention.

FIG. 5A shows in a simplified flowchart format the steps taken by an object editor in communicating the attributes of a selected portion of the content to an interested EC in accordance with one aspect of the present invention. FIG. 5A starts at block 520. From block 520, the method proceeds the block 522 wherein the method ascertains whether a selection has been made in the content associated with the active object editor. If no selection has been made, the method simply waits until a selection is made.

On the other hand, if a selection has been made in the content, the method proceeds to block 524 wherein the object editor obtains an auditor data structure. In one embodiment, the object editor associated with the selected content may obtain an auditor data structure from the facilitator. In another embodiment, however, the object editor may already has associated with it an auditor data structure. From block 524, the method proceeds to block 526 wherein the object editor associated with the selected content fills out the data fields of the auditor data structure with the attributes of the selected content. After the auditor data structure is filled out with the attributes of the selected content, the method proceeds to block 528 wherein the object editor sends the filled auditor data structure to interested EC's. The EC's may then update themselves with the attribute data encapsulated in the received auditor data structure(s). From block 528, the method proceeds to block 530 where the steps of FIG. 5A end.

Figure 5B:
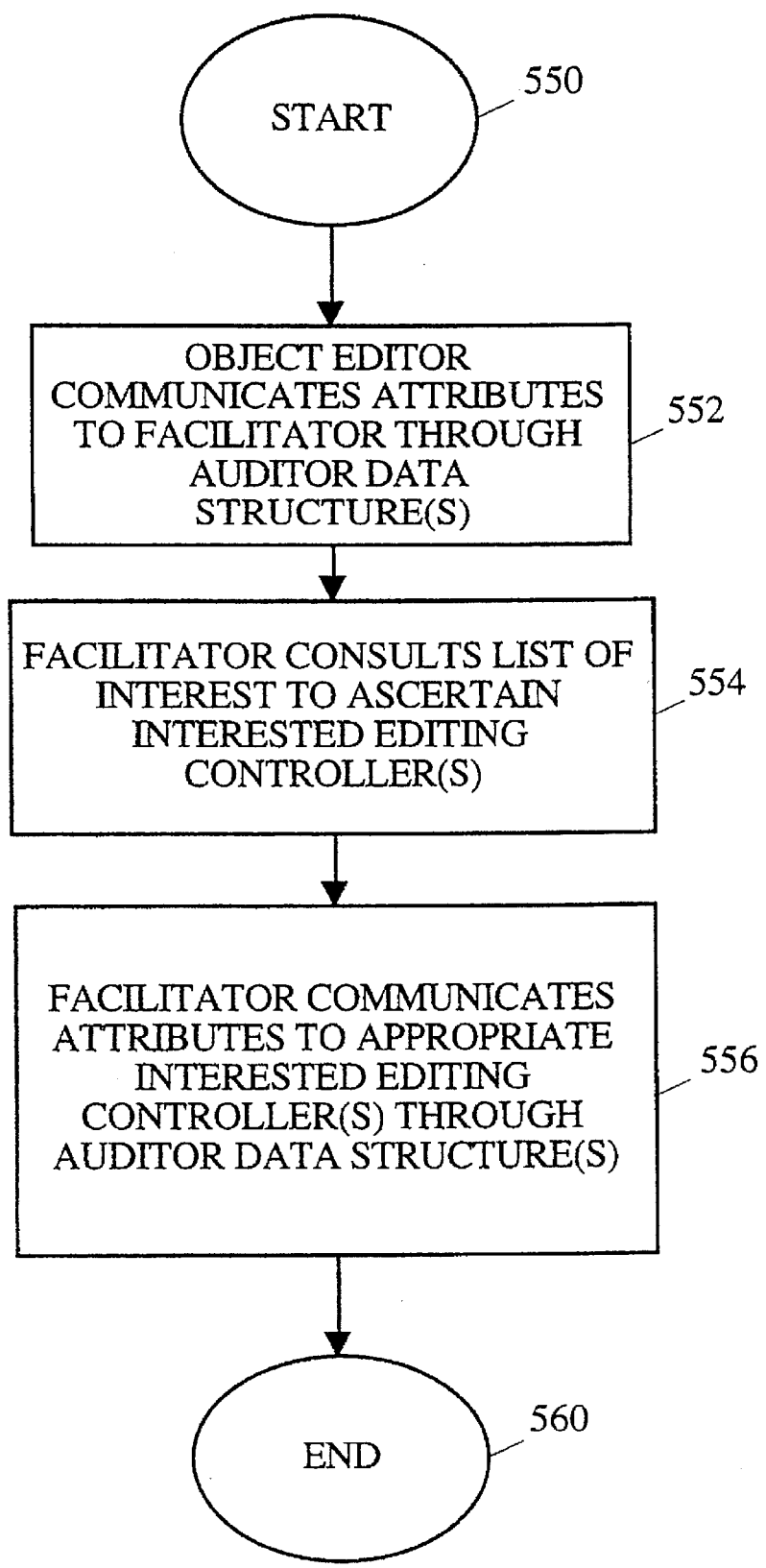
FIG. 5B is a flowchart illustrating the steps involved in block 528 (object editor sending filled auditor data structure to interested EC's) in accordance with one embodiment of the present invention.

FIG. 5B shows in a simplified flowchart format the steps involved in block 528 (object editor sending out filled auditor data structure to interested EC's) in accordance with one embodiment of the present invention. FIG. 5B starts at block 550. From block 550, the method proceeds to block 552 wherein the object editor associated with the selected content sends the filled auditor data structure to the facilitator. From block 552, the method proceeds to block 554 wherein the facilitator consults a list of interests, e.g., list of interests 466 of FIG. 3D, to ascertain the EC's that have expressed interest in the type of data represented by the selected content. After the interested EC's are ascertained from the list of interests in block 554, the method proceeds to block 556 wherein the facilitator sends the filled auditor data structure to the interested EC's (which have been ascertained in block 554). From block 556, the method proceeds to block 560 where the steps of FIG. 5B end.

Figure 6A:
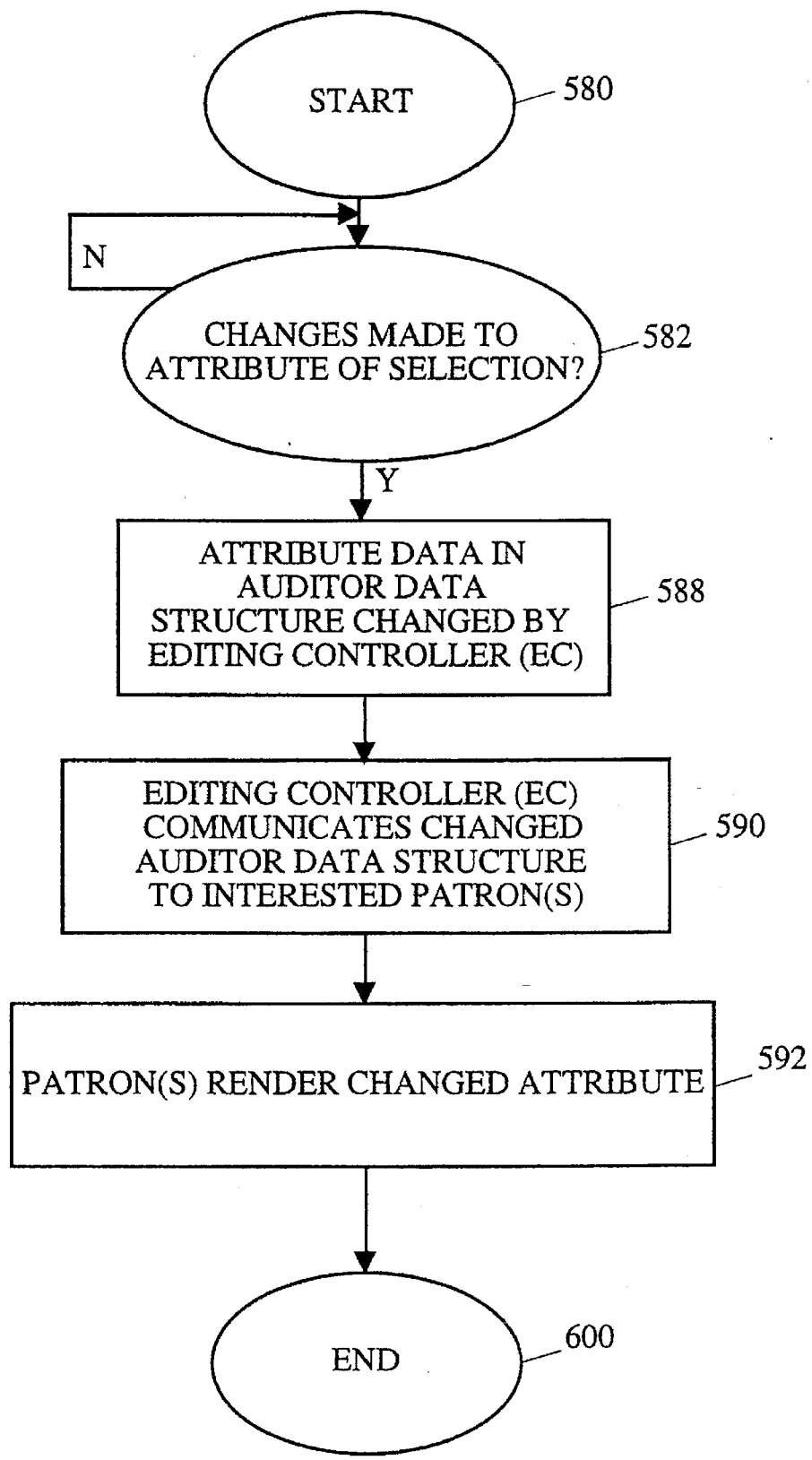
FIG. 6A is a flowchart illustrating the steps involved when an EC sends changed attribute data back to an object editor.

FIG. 6A shows in a simplified flowchart format the steps involved when an EC sends changed attribute data back to an object editor. The steps of FIG. 6A may be invoked when, for example, a computer user has manipulated the controls on an EC to change the attributes of a selected content. FIG. 6A starts at block 580. From block 580, the method proceeds to block 582 wherein the method ascertains whether changes have been made to the attributes in the auditor data structure via an EC. If no changes have been made to the attributes in the data fields of the auditor data structure, the method simply waits.

On the other hand, if the computer user has manipulated the controls of the EC to change the attributes of the selected content, these attribute changes will be reflected in the data fields of the auditor data structure. In this case, the method proceeds from block 582 to block 584 wherein the attribute data is changed in the data fields of the auditor data structure by the EC. From block 588, the method proceed to block 590 wherein the EC sends the changed auditor data structure to the interested object editors. From block 590, the method proceeds to block 592 wherein the object editor, after receiving the changed auditor data structure, renders the changed attributes and reflect those changes in the selected content. From then, the method proceeds to block 600 wherein the steps of FIG. 6A end.

Figure 6B:
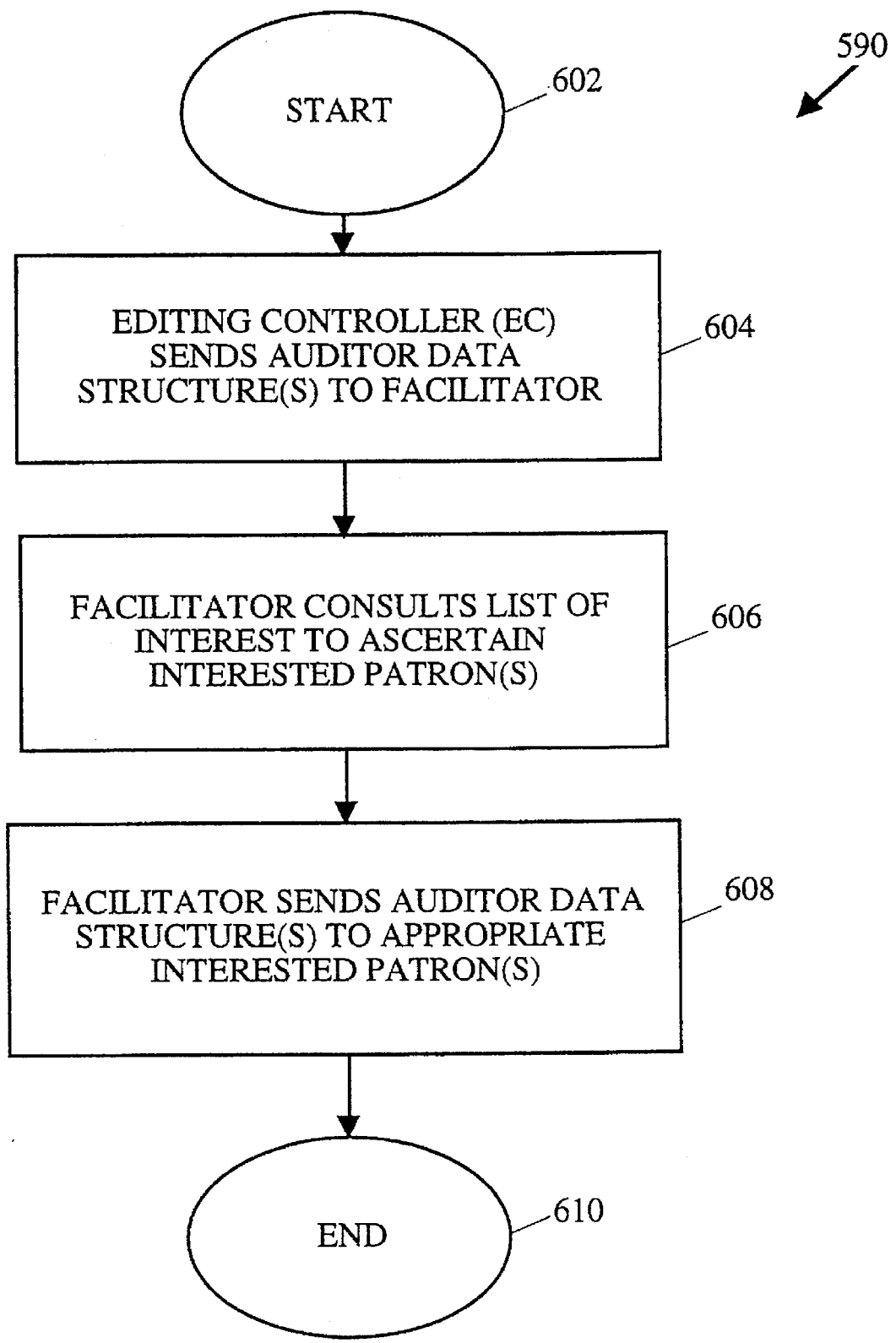
FIG. 6B is a flowchart illustrating the steps involved in block 590 (EC sending changed auditor data structure to interested object editors) in accordance with one aspect of the present invention.

FIG. 6B shows in a simplified flowchart format the steps involved in block 590 (EC sending changed auditor data structure to interested object editors) in accordance with one aspect of the present invention. FIG. 6B starts at block 602. From block 602, the method proceeds to block 604 wherein the EC sends the changed auditor data structure to the facilitator. In block 606, the facilitator consults a list of interests, e.g., list of interests 466 of FIG. 3D, to ascertain the object editors that have expressed an interest in the type of data represented in the auditor data structure. In block 608, the facilitator sends the changed auditor data structure(s) to the interested object editor(s) (which were ascertained in block 606). As mentioned earlier, the changed auditor data structure may be sent to only the interested object editor which is currently active. In another embodiment, however, all interested object editors may receive and respond to the changed attributes. From block 608, the method proceeds to block 610 wherein the steps of FIG. 6B end.

Figure 7:
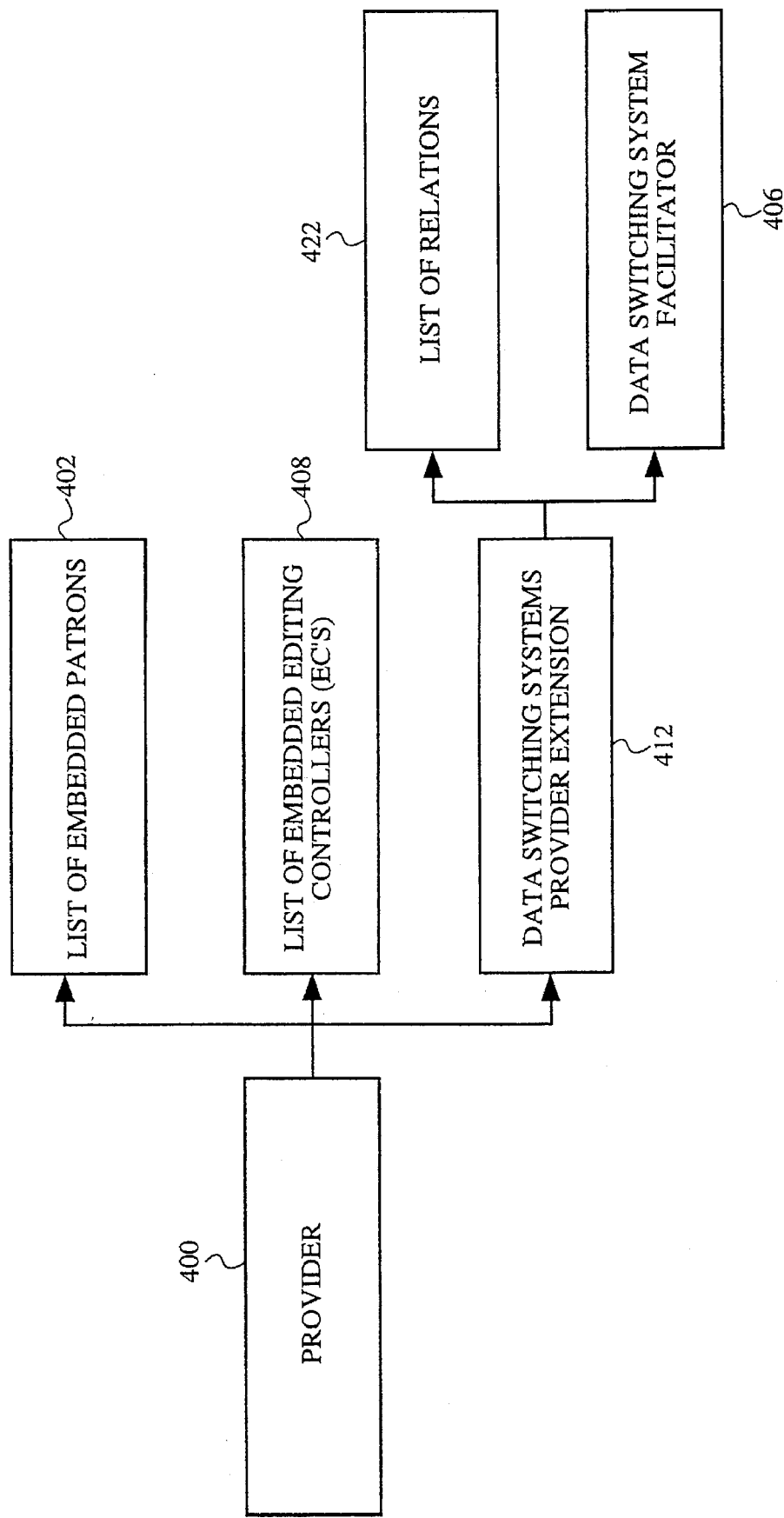
FIG. 7 is a diagram illustrating the relationship between a provider, list of embedded patrons, list of embedded EC's, an extension to the aforementioned OpenDoc™ provider (VSX provider extension), list of relations, and VSX facilitator of FIG. 3C.

FIG. 7 shows in a simplified diagram format the relationship between provider 400, list of embedded patrons 402, list of embedded EC's 408, VSX provider extension 412, list of relations 422, and VSX facilitator 406 of FIG. 3C. Provider 400 represents an object editor that is preferably, but not necessarily, the first embedded object editor in an enhanced compound document. In other words, it is possible to create an enhanced compound document by embedding patrons first before embedding the provider object.

It should be noted that an object may be predefined as a provider object, a patron object, or an EC by its developer an object may also function in more than one role. For example, a developer may supply an object editor which is capable of functioning both as a provider and a patron. When an object is capable of assuming more than one role, it has all the components of all the objects that it is capable of assuming.

When an object which is capable of functioning as a provider is embedded in an enhanced compound document, that object will try to register itself with the data switching system as a provider. If there is already a provider in the enhanced compound document, the data switching system will return a flag, for example a Boolean variable, to indicate that such registration of the newly embedded object as a provider is not possible. If that object is also capable of functioning as a patron, it will then register itself as a patron in the enhanced compound document. This is because there can only be one provider in an enhanced compound document but there may be many patrons.

Referring to FIG. 7, a provider 400 has a pointer that point to VSX provider extension 412. Further, provider 400 has an application programming interface (API) to provide access to the objects where all VSX system features that relate to being provider reside. A provider 400 also has data such as list of embedded patrons 402 and list of embedded EC's 408. As mentioned earlier, list of embedded patrons 402 represents a list of all patrons being embedded in the enhanced compound document. Similarly, list of embedded EC's 408 keep track of the EC's that have been embedded in the enhanced compound document.

VSX provider extension 412 further includes a list of relations 422 which, as mentioned earlier, allows provider 400 to rank all embedded components relative to a particular goal. For example, a list of relations 422 may represent a way to indicate the relative importance of the embedded patrons relative to the goal that the enhanced compound document is trying to achieve. VSX provider extension 412 has a pointer to a VSX facilitator 406, representing the gateway through which patrons, editing controllers (EC's), and a provider may indirectly communicate with one another.

Figure 8:
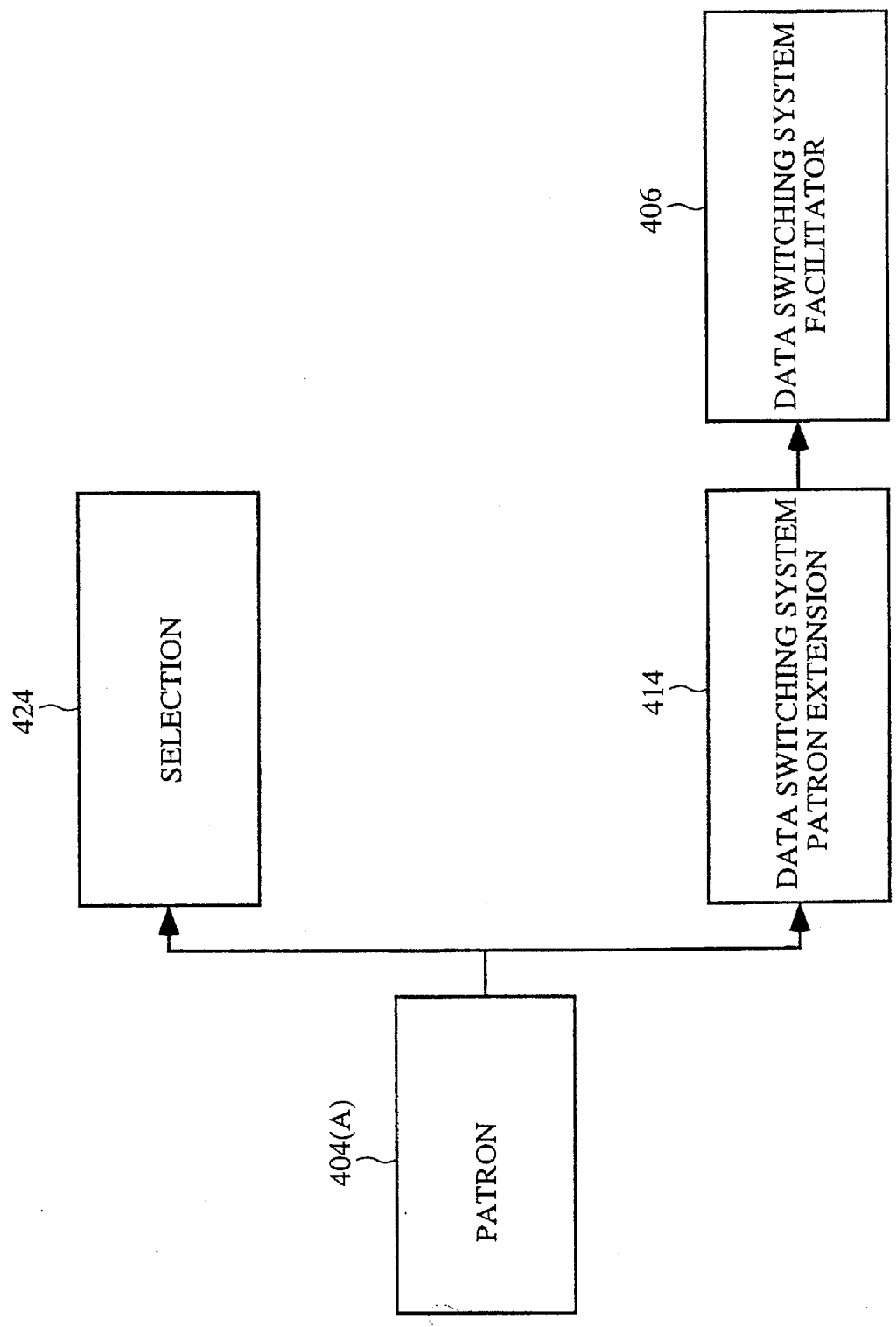
FIG. 8 is a diagram illustrating the relationship between a patron, a selection, a VSX patron extension, and a VSX facilitator.

FIG. 8 shows in a simplified diagram format the relationship between a patron, such as patron 404A of FIG. 3C, selection 424, VSX patron extension 414, and VSX facilitator 406. As mentioned earlier, a patron includes an embedded object editor and may further include the data which it renders and manipulates. Patron 404A further includes a selection facility 424 for indicating the portion of the content rendered and manipulated by patron 404A which has been selected by the computer user as a target of user operation. Patron 404A further has a pointer that point toward VSX patron extension 414. As mentioned earlier, VSX patron extension 414 represents the means by which patron 404A can communicate the attribute data of its selected content to EC's. VSX patron extension 414 further includes a pointer to VSX facilitator 406, which represents the gateway through which patrons, editing controllers (EC's), and provider communicate regarding the attributes of a selected content.

Figure 9:
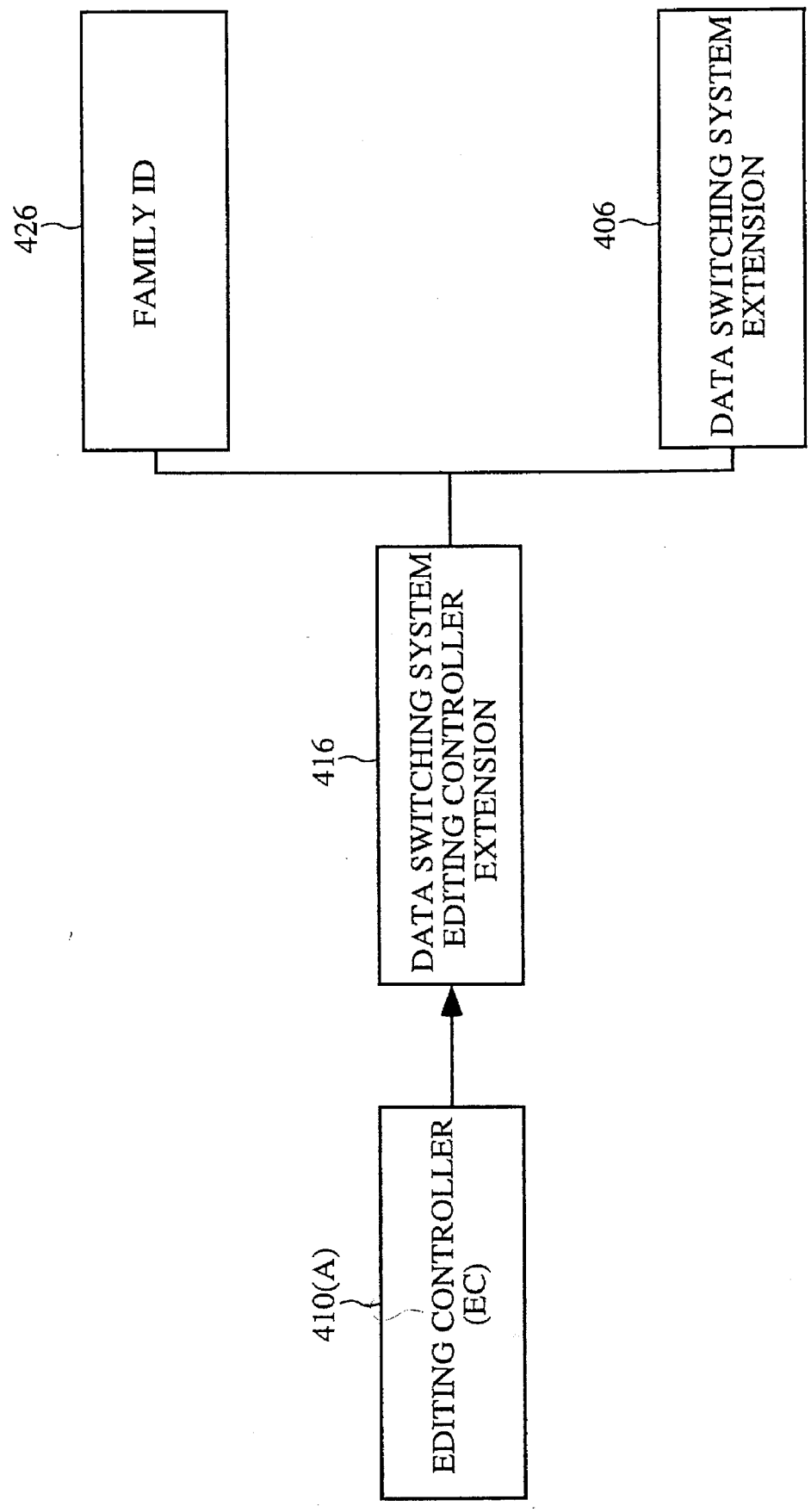
FIG. 9 is a diagram illustrating the relationship between an editing controller (EC), a VSX EC extension, a family ID facility, and a VSX facilitator.

FIG. 9 shows in a simplified diagram format the relationship between an editing controller (EC), such as EC 410A of FIG. 3C, VSX EC extension 416, family ID facility 426, and VSX facilitator 406. EC 410(a) represents the tool for editing the attribute(s) of a selected content. EC 410(a) has a pointer to VSX EC extension 416, representing the means by which an EC may communicate with an object editor regarding the content attribute(s) of a selection.

In one embodiment; VSX EC extension 416 is further associated with a family ID facility 426. As mentioned earlier, a family ID represents a way to indicate relationships between EC's. VSX EC extension 416 further has a pointer to VSX facilitator 406 which, as mentioned earlier, representing the gateway through which an editing controller (EC), patrons, and a provider may communicate regarding content attribute data of a selection.

Although the foregoing invention has been described in some detail for purposes of clarity of understanding, it will be apparent that certain changes and modifications may be practiced within the scope of the appended claims. For instance, although the specification has described in detail different methods for performing updates of the EC's and the object editors, these steps do not, in some instances, have to follow the exact sequence described and may be modified to achieve substantially the same result by one skilled in the art without departing from the scope and spirit of the present invention.

Further, although the invention is described using flow diagrams as an illustration aid, it should be noted that the methods and apparatus of the present invention may be event-driven, capable of executing multiple processes at the same time. As such, different processes and tasks do not necessarily have to be performed in the specific sequential order chosen for illustration, and a computer and/or software program implementing the inventive method may be executing other tasks while executing the inventive method disclosed herein.

As a further example, it should be noted that although a window is used herein to facilitate discussion of a compound document and its various elements, there is no requirement that a compound document created in accordance with the inventive technique disclosed herein must be implemented in a window, or in a window that is similar to the window of FIG. 1. The fact that the compound document may be implemented in a graphical user interface (GUI) environment is not central to the present inventive concept.

Such adaptation and optimization, as well as others within the abilities of those of skills in the art, may be performed on the apparatus and methods disclosed herein without departing from the scope and spirit of the present invention. Consequently, the scope of the invention is not limited to the specific examples given herein but is set forth in the appended claims.

What is claimed is:

1. A compound document in a computer, comprising:

a first object editor embedded in said compound document for rendering first data in a first data content area of said compound document;

a second object editor embedded in said compound document for rendering second data in a second data content area of said compound document, said first data content area and said second data content area being mutually exclusive;

a plurality of editing controllers embedded in said compound document for selectively editing attributes of a selection of one of said first and second data, said editing controllers being displayed in a UI container that does not substantially change in appearance when said first or said second object editor is a focus of user operation; and a data switching system for communicating attribute data between said editing controllers and said first and second object editors, said attribute data representing said attributes of said selection, wherein said data switching system determines which one of said plurality of editing controllers receives said attribute data based on interest registered by each of said plurality of editing controllers with said data switching system.

2. The compound document of claim 1 wherein said first object editor is a provider.

3. The compound document of claim 2 wherein said second object editor is a patron.

4. The compound document of claim 1 wherein said first object editor is incapable of rendering said second data and said second object editor is incapable of rendering said first data.

5. The compound document of claim 1 wherein an editing context associated with said compound document does not change irrespective whether said first object editor or said second object editor is a focus of user operation.

6. A method for creating a compound document in a computer, comprising:

embedding a first object editor in said compound document for rendering first data in a first data content area of said compound document;

embedding a second object editor in said compound document for rendering second data in a second data content area of said compound document, said first data content area and said second data content area being mutually exclusive;

embedding a plurality of editing controllers in said compound document for selectively editing attributes of a selection of one of said first and second data, said editing controllers being displayed in a UI container that substantially maintains its appearance when one of said first and said second object editor is focus of operation; and providing a data switching system for communicating attribute data between said editing controllers and said first and second object editors, said attribute data representing said attributes of said selection, wherein said data switching system determines which one of said plurality of editing controllers receives said attribute data based on interest registered by each of said plurality of editing controllers with said data switching system.

7. The method of claim 6 wherein said first object editor is a provider.

8. The method of claim 7 wherein said second object editor is a patron.

9. The method of claim 6 wherein said first object editor is incapable of rendering said second data and said second object editor is incapable of rendering said first data.

10. The compound document of claim 6 wherein an editing context associated with said compound document does not change irrespective whether said first object editor or said second object editor is a focus of user operation.

11. A method for creating a compound document in a computer, comprising:

providing a provider extension for use in a cooperative coupling arrangement with a first object editor, said first object editor being associated with an existing unenhanced compound document architecture and being capable of rendering first data in a first data content area of said compound document;

providing a patron extension for use in a cooperative coupling arrangement with a second object editor, said second object editor being associated with said existing unenhanced compound document architecture and being capable of rendering second data in a second data content area of said compound document, said first data content area and said second data content area being mutually exclusive;

providing an editing controller extension with an editing controller, said editing controller representing an object for selectively editing attributes of a selection of one of said first and second data, said editing controller being displayed in a UI container that substantially maintains its appearance when one of said first and said second object editor is a focus of operation; and providing a data switching system for communicating attribute data between said editing controller and said first and second object editors through said editing controller extension, said provider extension, and said patron extension respectively, said attribute data representing said attributes of said selection, wherein said data switching system determines which one of said provider and patron receives said attribute data based on interest registered by said provider and patron with said data switching system.

12. The method of claim 11 wherein said first object editor is incapable of rendering said second data and said second object editor is incapable of rendering said first data.

13. The method of claim 11 wherein an editing context associated with said compound document does not change irrespective whether said first object editor or said second object editor is a focus of user operation.

14. A method of processing data in a compound document, said compound document having an embedded object editor for rendering said data, comprising:

providing a plurality of editing controllers embedded in said compound document, said editing controllers being displayed in a UI container that substantially maintains its appearance when said embedded object editor is a focus of operation;

detecting whether a selection is made in said data;

filling out an auditor data structure with first attributes of said selection; and communicating said first attributes to interested ones of said editing controllers through said auditor data structure.

15. The method of claim 14 wherein said step of communicating said first attributes comprises the step of communicating said first attributes through said auditor data structure to a facilitator.

16. The method of claim 15 wherein said step of communicating said first attributes further comprising the step of communicating said first attributes from said facilitator to said interested ones of said editing controllers.

17. The method of claim 15 wherein said interested ones of said editing controllers are ascertained by said facilitator using a list of interest.

18. The method of claim 14 further comprising the step of communicating second attributes from one of said editing controller to said embedded object editor if said embedded object editor has expressed an interest in receiving said second attribute in a list of interest.

19. The method of claim 18 wherein said second attributes represents an edited version of said first attributes.

20. The method of claim 19 wherein said step of communicating second attributes comprises the steps of:

communicating said second attributes from said one of said editing controllers to said facilitator, and communicating said second attributes from said facilitator to said embedded object editor.

21. A computer readable medium containing program instructions for detecting whether a selection is made in data of a first content area of a compound document having a plurality of content areas;

communicating attributes of said selection to a data switching system; and communicating said attributes to interested ones of editing controllers from said data switching system, said editing controllers being embedded in said compound document for editing attributes of a selection in one of said plurality of content areas, said interested ones of said editing controllers being ascertained based on interest associated with said interested ones of said editing controllers, said editing controllers being controlled through a UI container that substantially maintains its appearance when any one of said plurality of content areas are selected.

* * * * *